(12) United States Patent
Eda et al.

(10) Patent No.: US 9,998,974 B2
(45) Date of Patent: Jun. 12, 2018

(54) WIRELESS COMMUNICATION TERMINAL, STORAGE MEDIUM, AND CELL SELECTION METHOD

(71) Applicant: NEC Corporation, Tokyo (JP)

(72) Inventors: Shintaro Eda, Tokyo (JP); Satoshi Oura, Tokyo (JP)

(73) Assignee: NEC Corporation, Tokyo (JP)

( * ) Notice: Subject to any disclaimer, the term of this patent is extended or adjusted under 35 U.S.C. 154(b) by 25 days.

(21) Appl. No.: 15/038,014

(22) PCT Filed: Nov. 27, 2014

(86) PCT No.: PCT/JP2014/005937
§ 371 (c)(1),
(2) Date: May 19, 2016

(87) PCT Pub. No.: WO2015/079695
PCT Pub. Date: Jun. 4, 2015

(65) Prior Publication Data
US 2016/0295490 A1  Oct. 6, 2016

(30) Foreign Application Priority Data

Nov. 28, 2013  (JP) .................................. 2013-246289

(51) Int. Cl.
*H04W 36/30* (2009.01)
*H04W 16/32* (2009.01)
(Continued)

(52) U.S. Cl.
CPC ............ *H04W 36/30* (2013.01); *H04W 16/32* (2013.01); *H04W 36/0088* (2013.01); *H04W 48/20* (2013.01); *H04W 48/16* (2013.01)

(58) Field of Classification Search
CPC ..... H04W 72/02; H04W 36/32; H04W 36/30; H04W 24/02; H04W 88/08;
(Continued)

(56) References Cited

U.S. PATENT DOCUMENTS

2002/0019231 A1\* 2/2002 Palenius ........... H04W 36/0083
455/437
2005/0130662 A1  6/2005 Murai
(Continued)

FOREIGN PATENT DOCUMENTS

JP  2002-135825 A  5/2002
JP  2007-514367 A  5/2007
(Continued)

OTHER PUBLICATIONS

International Search Report, Corresponding to PCT/JP2014/005937, dated Mar. 3, 2015, 2 pp.
(Continued)

*Primary Examiner* — Ian N Moore
*Assistant Examiner* — Phong La
(74) *Attorney, Agent, or Firm* — Wilmer Cutler Pickering Hale and Dorr LLP

(57) ABSTRACT

A load of a base station can be effectively distributed without decreasing a communication rate of a wireless communication terminal. A wireless communication terminal for use in a wireless network including a first cell and a second cell that include a common portion, the wireless communication terminal comprises a quality calculation means for determining first quality that is wireless quality of the first cell and second quality that is wireless quality of the second cell; a resource number calculation means for determining a first resource number that is the number of available frequency resources in the first cell and a second resource number that is the number of available frequency resources in the second (Continued)

cell; a coefficient calculation means for determining a first cell selection coefficient that is a cell selection coefficient for the first cell based on a result obtained by calculating the first quality and the first resource number, and determining a second cell selection coefficient that is a cell selection coefficient for the second cell based on a result obtained by calculating the second quality and the second resource number; and a cell selection means for selecting one of the first cell and the second cell based on a result of calculation using the first cell selection coefficient and the second cell selection coefficient.

10 Claims, 14 Drawing Sheets

(51) Int. Cl.
*H04W 48/20* (2009.01)
*H04W 36/00* (2009.01)
*H04W 48/16* (2009.01)

(58) Field of Classification Search
CPC . H04W 36/0088; H04W 16/32; H04W 48/20; H04W 48/16; H04L 5/0096
See application file for complete search history.

(56) References Cited

U.S. PATENT DOCUMENTS

| | | | | |
|---|---|---|---|---|
| 2006/0020203 | A1* | 1/2006 | Tamura | G06T 5/20 600/437 |
| 2008/0151849 | A1* | 6/2008 | Utsunomiya | H04W 72/0486 370/338 |
| 2009/0285159 | A1 | 11/2009 | Rezaiifar et al. | |
| 2010/0057810 | A1* | 3/2010 | El | H03M 7/40 707/754 |
| 2010/0214928 | A1* | 8/2010 | Nogami | H04W 72/0413 370/241 |
| 2011/0013506 | A1* | 1/2011 | Ishii | H04W 72/1242 370/208 |
| 2011/0038018 | A1* | 2/2011 | Kurigata | H04N 1/053 358/474 |
| 2011/0098054 | A1* | 4/2011 | Gorokhov | H04B 7/024 455/452.1 |
| 2011/0124330 | A1* | 5/2011 | Kojima | H04W 36/32 455/424 |
| 2011/0158530 | A1* | 6/2011 | Okihara | G06F 21/64 382/173 |
| 2011/0304502 | A1* | 12/2011 | Chen | G08G 3/02 342/352 |
| 2012/0064832 | A1* | 3/2012 | Likar | H04W 24/02 455/62 |
| 2013/0183976 | A1* | 7/2013 | Zhuang | H04W 48/20 455/436 |
| 2014/0169197 | A1* | 6/2014 | Damnjanovic | H04W 48/18 370/252 |
| 2014/0171086 | A1* | 6/2014 | Nakamori | H04W 36/0088 455/436 |
| 2014/0328307 | A1* | 11/2014 | Takano | H04W 48/18 370/329 |
| 2014/0334318 | A1* | 11/2014 | Pica | H04W 36/14 370/252 |
| 2014/0341572 | A1* | 11/2014 | Sambo | H04J 14/0257 398/48 |
| 2015/0092709 | A1* | 4/2015 | Su | H04W 48/16 370/329 |
| 2015/0099529 | A1* | 4/2015 | Brisebois | H04W 16/08 455/453 |
| 2015/0373601 | A1* | 12/2015 | Benjebbour | H04W 72/082 370/252 |
| 2016/0088487 | A1* | 3/2016 | Yu | H04W 16/14 370/329 |
| 2016/0119816 | A1* | 4/2016 | Yasukawa | H04W 48/20 455/453 |
| 2017/0118678 | A1* | 4/2017 | Brisebois | H04W 28/08 |

FOREIGN PATENT DOCUMENTS

| | | |
|---|---|---|
| JP | 2010-521876 A | 6/2010 |
| JP | 2011-504056 A | 1/2011 |
| JP | 2011-522471 A | 7/2011 |
| JP | 2013-509108 A | 3/2013 |
| JP | 2013-153333 A | 8/2013 |
| WO | WO-2005/057975 A1 | 6/2005 |
| WO | WO-2009/140647 A2 | 11/2009 |
| WO | WO-2011/136083 A1 | 11/2011 |

OTHER PUBLICATIONS

3GPP TS 36.300 v10.11.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Sep. 2013, 195 pp.
3GPP TS 36.211 v10.7.0, Technical Specification, 3rd Generation Partnership Project; Technical Specification Group Radio Access Network; Evolved Universal Terrestrail Radio Access (E-UTRA); Physical Channels and Modulation (Release 10), Feb. 2013, 101 pp.
3GPP TS 36.214 v10.1.0, Technical Specification, 3rd Generation Partnership Project; Technical Specification Group Radio Access Network; Evolved Universal Terrestrial Radio Access (E-UTRA) Physical layer; Measurements (Release 10), Mar. 2011, 13 pp.
3GPP TSG-RAN WG1#58, R1-093433, Kyocera, Uplink performance evaluation in heterogeneous deployment, Shenzhen P.R. China, Aug. 24-28, 2009, 8 pp.
Japanese Office Action issued by the Japan Patent Office for Japanese Application No. 2015-550569 dated Feb. 20, 2018 (5 pages).

* cited by examiner

WIRELESS COMMUNICATION TERMINAL, STORAGE MEDIUM, AND CELL SELECTION METHOD

CROSS-REFERENCE TO RELATED APPLICATIONS

The present application is a national stage application of International Application No. PCT/JP2014/005937 entitled "Wireless Communication Terminal, Storage Medium, and Cell Selection Method," filed on Nov. 27, 2014, which claims the benefit of priority from Japanese Patent Application No. 2013-246289, filed on Nov. 28, 2013, the disclosures of which are incorporated herein in their entirety by reference thereto.

TECHNICAL FIELD

The present invention relates to a wireless communication terminal in a network, in particular, a so-called heterogeneous network used by mixing cells having sizes different from each other, a storage medium, and a cell selection method.

BACKGROUND ART

As a next-generation wireless communication system for realizing high-speed and large-capacity communication, there is known LTE-Advanced (Long Term Evolution-Advanced) standardized by 3GPP (3rd Generation Partnership Project) that is a standards body. As described in NPL 1, in LTE-Advanced, provided is a heterogeneous network in which in a macro cell formed by a macro cell base station, a pico cell base station including a pico cell having a cell radius smaller than that of the macro cell is disposed. In general, a radius of a macro cell is several hundred to several thousand meters, and a radius of a pico cell is several ten to several hundred meters.

As illustrated in FIG. 13, for example, a wireless communication system 600 in a heterogeneous network includes a plurality of wireless base stations (for example, a macro cell base station 61 and a pico cell base station 62) and a wireless communication terminal (User Equipment) (hereinafter, referred to as a "UE") 63. Each of the wireless base stations is communicable with an MME/SAE-GW 65 of a core network unit that is a host node of the wireless base stations via an S1 interface 64. In the above description, MME/SAE-GW is an abbreviation of Mobility Management Entity/System Architecture Evolution Gateway. Further, the respective wireless base stations are communicable with each other via an X2 interface 66. A macro cell 67 is a cell in which the macro cell base station 61 is communicable. A pico cell 68 having a cell radius smaller than a cell radius of the macro cell 67 is formed in the macro cell 67. The pico cell 68 is a cell in which the pico cell base station 62 is communicable. On the basis of the cell disposition described above, the pico cell 68 can accommodate the UE 63 connected to the macro cell 67. Therefore, a load of the macro cell base station 61 can be distributed. When the UE 63 is located in the macro cell 67, the UE 63 basically communicates with the macro cell base station 61, but when the UE 63 is further located in the pico cell 68, the UE 63 communicates with not the macro cell base station 61 but the pico cell base station 62.

Further, commonly, in a heterogeneous network, a UE compares reception quality in the UE of a wireless signal transmitted from a macro cell base station (hereinafter, referred to as "wireless quality of a macro cell") with reception quality in the UE of a wireless signal transmitted from a pico cell base station (hereinafter, referred to as "wireless quality of a pico cell"), and is connected to a base station having higher wireless quality. However, in general, transmission power of the macro cell base station is higher than transmission power of the pico cell base station, and therefore, in many cases, wireless quality of a macro cell is higher than wireless quality of a pico cell. Therefore, a chance in which a UE is accommodated in the pico cell is decreased. As a result, a problem that a load of the macro cell base station is not sufficiently distributed may occur.

For the problem described above, NPL 2 proposes that in LTE-Advanced, cell selection based on CRE (Cell Range Expansion) is executed. In the cell selection based on CRE, the UE 63 adds an offset value to wireless quality of a pico cell. By addition of the offset value, the pico cell 68 is changed to a pico cell 69 in which a cell radius is expanded, as illustrated in FIG. 13. Thereby, a chance in which a pico cell is selected as a connection destination of the UE is increased, and therefore load distribution of a macro cell base station is expectable.

PTL 1 describes that a first throughput representative value representing throughputs between a first wireless base station and terminals and a second throughput representative value representing throughputs between a second wireless base station and terminals are determined. On the basis of the first throughput representative value and the second throughput representative value, coverage of the first wireless base station and coverage of the second wireless base station are adjusted.

Further, PTL 1 describes a wireless base station that adjusts coverage of the own station. On the basis of a throughput between a wireless base station and a terminal, a communication area range of the wireless base station is adjusted. Further, there is no direct involvement in which one of wireless base stations is selected.

Further, PTL 2 describes that a parameter received from the outside is added to/subtracted from a cell-ranking measurement value, and on the basis of the cell-ranking measurement value after addition/subtraction, a cell is ranked, and thereby a cell is reselected on the basis of the ranking.

Further, PTL 3 describes a technique in which a CIO (Cell Individual Offset) parameter is set to be a lower value when a femto cell is present in a cell center, and is set to be a higher value when the femto cell is present in a cell edge.

CITATION LIST

Patent Literature

PTL 1: International Publication No. WO2011/136083
PTL 2: Japanese Translation of PCT International Application Publication No. 2010-521876
PTL 3: Japanese Translation of PCT International Application Publication No. 2013-509108

Non Patent Literature

NPL 1: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS36.300
NPT 2: "Uplink performance evaluation in heterogeneous deployment", R1-093433, 3GPP TSG-RAN WG1 #58

NPL 3: "3rd Generation Partnership Project; Technical Specification Group Radio Access Network; Evolved Universal Terrestrial Radio Access (E-UTRA); Physical Channels and Modulation (Release 10)", 3GPP TS36.211

NPL 4: "3rd Generation Partnership Project; Technical Specification Group Radio Access Network; Evolved Universal Terrestrial Radio Access (E-UTRA); Physical layer; Measurements (Release 10)", 3GPP TS36.214

SUMMARY OF INVENTION

Technical Problem

However, in cell section based on CRE, a UE does not consider the number of usable frequency resources in a cell but considers only respective wireless quality of a macro cell and a pico cell. Therefore, in a cell of a connection destination, a communication rate of the UE may decrease.

A reason why a communication rate of a UE decreases is described below. A case is assumed in which, for example, a value obtained by adding an offset to wireless quality of a pico cell is higher than wireless quality of a macro cell, the number of usable frequency resources in the macro cell is small, and the number of usable frequency resources in the pico cell is large.

In the above case, the UE is connected to the pico cell. However, a situation where the number of usable frequency resources in the pico cell is large is, in other words, a situation where the number of vacant frequency resources in the pico cell is small. Therefore, in the UE, the number of frequency resources allocated from the pico cell may be less than the number of frequency resources allocated from the macro cell. As a result, after a connection destination is switched from the macro cell to the pico cell, a communication rate of the UE may be decreased, compared with the rate before switching.

To solve the above problem, the present invention has been achieved, and an object of the present invention is to provide a wireless communication terminal, a storage medium, and a cell selection method capable of effectively distributing a load of a base station without decreasing a communication rate of the wireless communication terminal.

Solution to Problem

A wireless communication terminal according to the present invention is a wireless communication terminal used in a wireless network including a first cell and a second cell each including a common portion, and includes: a quality calculation means for determining first quality that is wireless quality of the first cell and second quality that is wireless quality of the second cell; a resource number calculation means for determining a first resource number that is the number of usable frequency resources in the first cell and a second resource number that is the number of usable frequency resources in the second cell; a coefficient calculation means for determining a first cell selection coefficient that is a cell selection coefficient for the first cell on the basis of a result obtained by calculating the first quality and the first resource number and determining a second cell selection coefficient that is a cell selection coefficient for the second cell on the basis of a result obtained by calculating the second quality and the second resource number; and a cell selection means for selecting any one of the first cell and the second cell on the basis of a result obtained by calculating the first cell selection coefficient and the second cell selection coefficient.

A storage medium according to the present invention stores a cell selection program that causes a computer of a wireless communication terminal used in a wireless network including a first cell and a second cell each including a common portion, to execute: a quality calculation function of determining first quality that is wireless quality of the first cell and second quality that is wireless quality of the second cell; a resource number calculation function of determining a first resource number that is the number of usable frequency resources in the first cell and a second resource number that is the number of usable frequency resources in the second cell; a coefficient calculation function of determining a first cell selection coefficient that is a cell selection coefficient for the first cell on the basis of a result obtained by calculating the first quality and the first resource number and determining a second cell selection coefficient that is a cell selection coefficient for the second cell on the basis of a result obtained by calculating the second quality and the second resource number; and a cell selection function of selecting any one of the first cell and the second cell on the basis of a result obtained by calculating the first cell selection coefficient and the second cell selection coefficient.

A cell selection method according to the present invention is a cell selection method in a wireless communication terminal used in a wireless network including a first cell and a second cell each including a common portion and includes: determining first quality that is wireless quality of the first cell and second quality that is wireless quality of the second cell; determining a first resource number that is the number of usable frequency resources in the first cell and a second resource number that is the number of usable frequency resources in the second cell; determining a first cell selection coefficient that is a cell selection coefficient for the first cell on the basis of a result obtained by calculating the first quality and the first resource number and determining a second cell selection coefficient that is a cell selection coefficient for the second cell on the basis of a result obtained by calculating the second quality and the second resource number; and selecting any one of the first cell and the second cell on the basis of a result obtained by calculating the first cell selection coefficient and the second cell selection coefficient.

Advantageous Effects of Invention

According to the present invention, a load of a base station can be effectively distributed without decreasing a communication rate of a wireless communication terminal.

DESCRIPTION OF EMBODIMENTS

In exemplary embodiments of the present invention, the respective numbers of usable frequency resources in a first cell (e.g. a macro cell) and a second cell (e.g. a pico cell) configuring a heterogeneous network are calculated in addition to respective wireless qualities thereof, and cell selection coefficients are calculated, whereby a connection destination cell of a UE is selected. Thereby, it becomes possible to effectively distribute traffic to both of the first cell and the second cell without sacrifice of a communication rate of the UE.

[First Exemplary Embodiment]
(Description of a Configuration)

Figure 1:
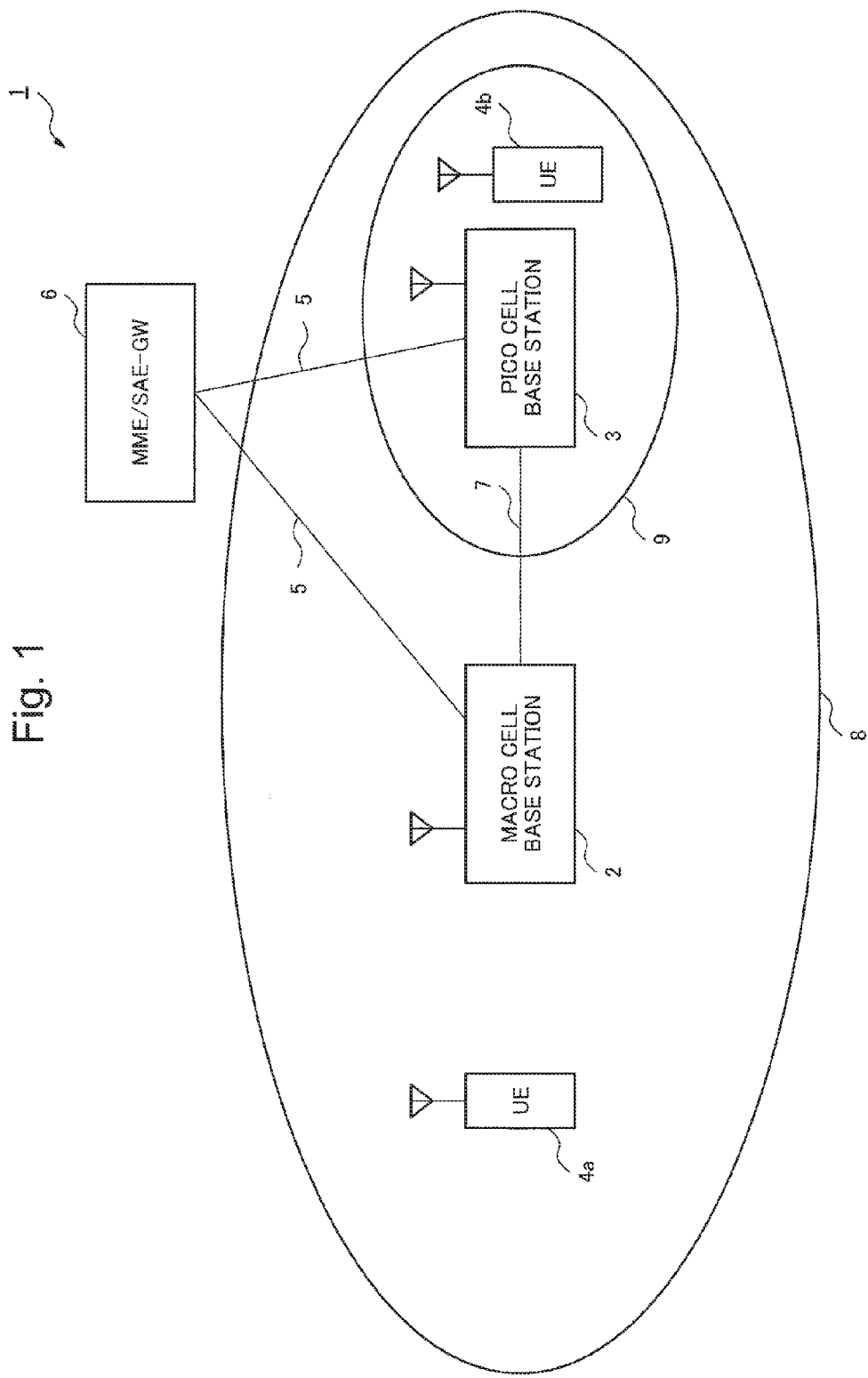
FIG. 1 is a block diagram illustrating a configuration example of a wireless communication system according to a first exemplary embodiment of the present invention.

FIG. 1 is a block diagram illustrating a configuration example of a wireless communication system 1 according to a first exemplary embodiment of the present invention. The wireless communication system 1 is a system configuring a heterogeneous network in which inside a macro cell 8 formed by a macro cell base station 2, a pico cell base station 3 that forms a pico cell 9 having a cell radius smaller than that of the macro cell 8 is disposed. Such a heterogeneous network is provided, for example, on the basis of LTE-Advanced standardized by 3GPP.

The wireless communication system 1 includes the macro cell base station 2, the pico cell base station 3, and a UE 4. In FIG. 1, for clearer description, there are one macro cell base station 2, one pico cell base station 3, and one UE 4, and a case in which the UE 4 is present in a location of a UE 4a and a case in which the UE 4 is present in a location of a UE 4b are illustrated. However, the above description is merely one example and the number in each configuration is not limited thereto.

The macro cell base station 2 and the pico cell base station 3 each are communicable with an MME/SAE-GW 6 of a core network unit that is a host node via an S1 interface 5. Further, the macro cell base station 2 and the pico cell base station 3 are communicable with each other via an X2 interface 7.

The macro cell base station 2 forms the macro cell 8 communicable with the UE 4. The pico cell base station 3 forms the pico cell 9 communicable with the UE 4. The pico cell 9 is smaller than the macro cell 8 and an entirety thereof is included in the macro cell 8. When the UE 4 connected to the macro cell 8 is accommodated in the pico cell 9, a load of the macro cell base station 2 is distributed to the pico cell base station 3.

In FIG. 1, the UE 4a is located in the macro cell 8 but is not located in the pico cell 9. On the other hand, in FIG. 1, the UE 4b is located in the pico cell 9. At that time, on the basis of the inclusion relation between the macro cell 8 and the pico cell 9, the UE 4 is inevitably located inside the macro cell 8. To serve the purpose of distributing a load applied to the macro cell base station 2 to the pico cell base station 3, as a matter of principle, when the UE 4 is present in the location of UE 4a, the UE 4 preferentially selects the macro cell base station 2 as an opposite base station of wireless communication. On the other hand, when the UE 4 is present in the location of the UE 4b, the UE 4 preferentially selects the pico cell base station 3.

Figure 2:
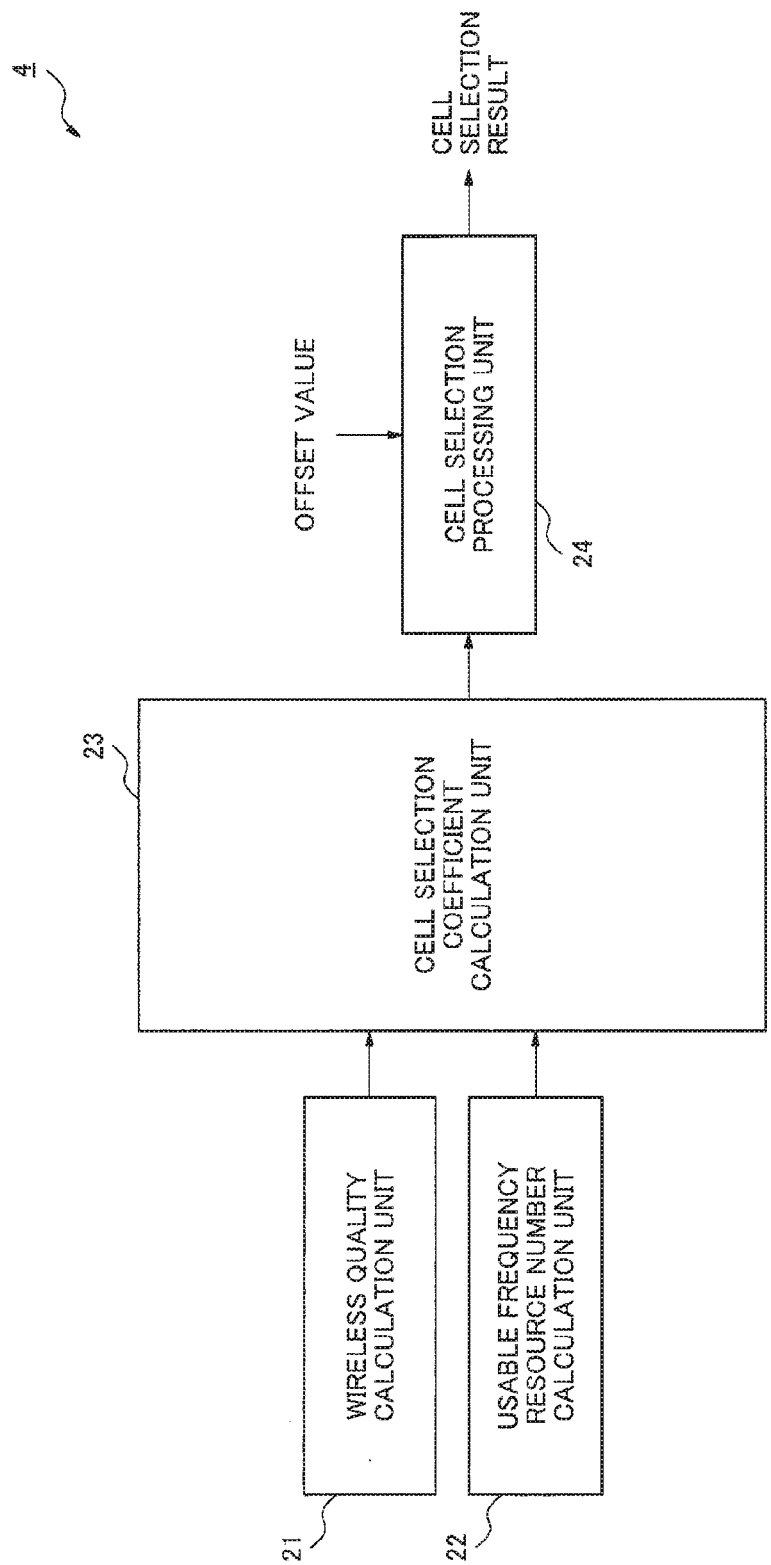
FIG. 2 is a block diagram illustrating a configuration example of a UE illustrated in FIG. 1.

FIG. 2 is a block diagram illustrating a configuration example of the UE 4 illustrated in FIG. 1. The UE 4 includes wireless quality calculation unit 21, a usable frequency resource number calculation unit 22, a cell selection coefficient calculation unit 23, and a cell selection processing unit 24. The components of the UE 4 each may be realized as a dedicated circuit or may be realized via operations of a processing device, not illustrated, included in the UE 4 in accordance with a program.

The wireless quality calculation unit 21 calculates a value that is an index of wireless quality for each of the macro cell 8 and the pico cell 9. The index of wireless quality is, for example, RSRP (Reference Signal Received Power), RSRQ (Reference Signal Received Quality), or SIR (Signal to Interference Ratio).

In the following description, a case in which the index of wireless quality is RSRP will be cited as an example. The wireless quality calculation unit 21 determines RSRP (hereinafter, referred to as "M-RSRP") of the macro cell 8 on the basis of a reference signal of a wireless signal transmitted from the macro cell base station 2. The wireless quality calculation unit 21 determines RSRP (hereinafter, referred to as "P-RSRP") of the pico cell 9 on the basis of a reference signal of a wireless signal transmitted from the pico cell base station 3. As a method for determining RSRP from a reference signal, for example, the method described in NPL 4 is usable.

The usable frequency resource number calculation unit 22 calculates a number Ra_Macrocell of frequency resources usable in the macro cell 8 and a number Ra_Picocell of frequency resources usable in the pico cell 9. The usable frequency resource number calculation unit 22 transfers the determined Ra_Macrocell and Ra_Picocell to the cell selection coefficient calculation unit 23.

The usable frequency resource number calculation unit 22 determines Ra_Macrocell and Ra_Picocell as described below. Initially, as an assumption, the total RB (Resource Block) number of a frequency band in downstream communication from a base station to a UE is defined as Nrb, the number of usable frequency resources in a pico cell obtained by averaging in an interval T is defined as $\alpha(T)$, and the number of usable frequency resources in a macro cell obtained by averaging in the interval T is defined as $\beta(T)$. The interval T is a constant representing a length of a period of time and is not specifically limited when being, for example, equal to or greater than 40 milliseconds as a cycle of a downstream channel signal specified in NPL 3.

The usable frequency resource number calculation unit 22 calculates Ra_Macrocell=Nrb−β(T) and Ra_Picocell=Nrb−α(T).

The cell selection coefficient calculation unit 23 determines cell selection coefficients for the macro cell 8 and the pico cell 9 on the basis of the wireless qualities (M_RSRP and P_RSRP) of the macro cell 8 and the pico cell 9 and the numbers of usable frequency resources (Ra_Macrocell and Ra_Picocell) in the macro cell 8 and the pico cell 9, respectively. The cell selection coefficient is a coefficient that is an index used upon determining which one of the macro cell 8 and the pico cell 9 is selected. The cell selection coefficient is a coefficient obtained, for example, by multiplying a wireless quality of the cell by the number of usable frequency resources in the cell. In other words, when a cell selection coefficient for the macro cell 8 is designated as f_Macrocell and a cell selection coefficient for the pico cell 9 is designated as f_Picocell, the cell selection coefficient calculation unit 23 determines f_Macrocell=M_RSRP× Ra_Macrocell and f_Picocell=P_RSRP×Ra_Picocell. The cell selection coefficient calculation unit 23 transfers the determined cell selection coefficients f_Macrocell and f_Picocell to the cell selection processing unit 24.

(Description of Operations)

Figure 3:
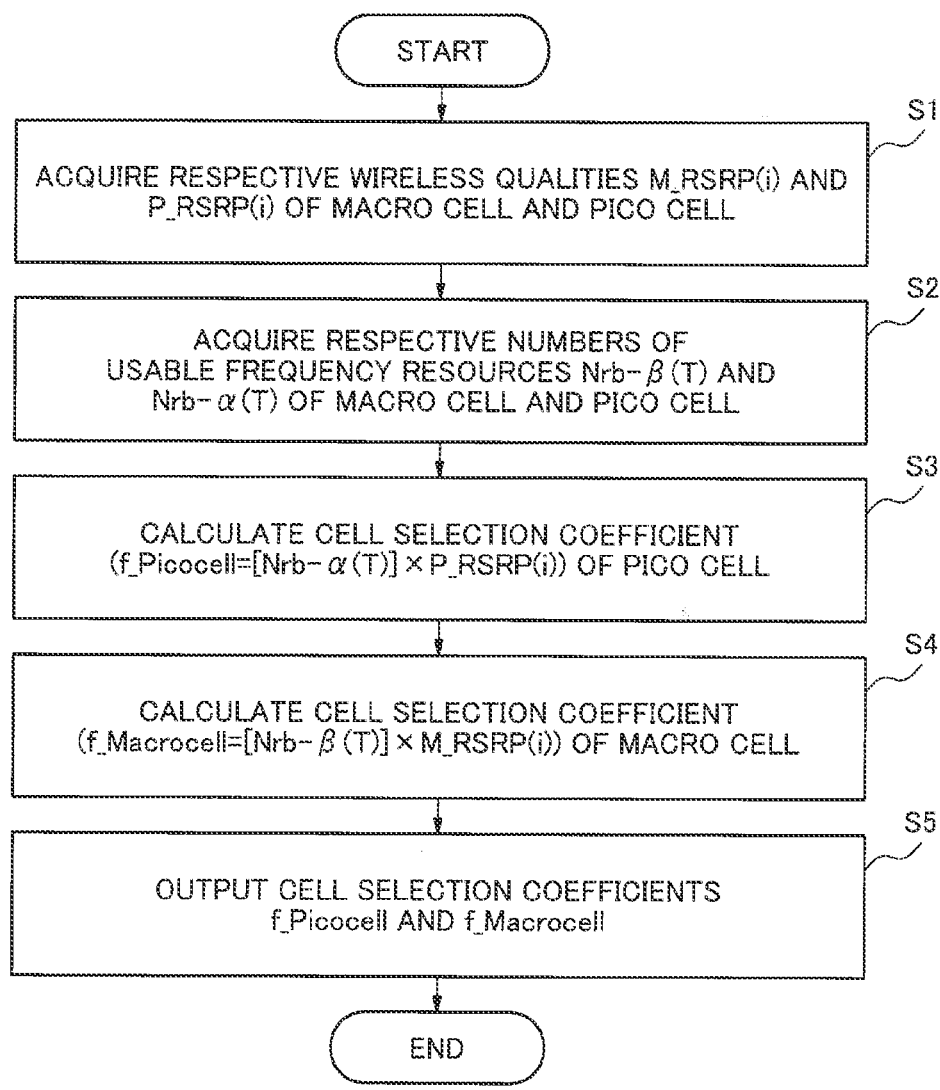
FIG. 3 is a flowchart for illustrating an operation example of a cell selection coefficient calculation unit illustrated in FIG. 2.

FIG. 3 is a flowchart for illustrating an operation example of the cell selection coefficient calculation unit 23 illustrated in FIG. 2. The cell selection coefficient calculation unit 23 receives respective wireless qualities M_RSRP and P_RSRP of the macro cell 8 and the pico cell 9 from the wireless quality calculation unit 21 (step S1).

The cell selection coefficient calculation unit 23 receives the respective numbers of usable frequency resources, Ra_Macricell and Ra_Picocell, in the macro cell 8 and the pico cell 9 from the usable frequency resource number calculation unit 22 (step S2).

The cell selection coefficient calculation unit 23 determines a cell selection coefficient f_Picocell=P_RSRP× Ra_Picocell of the pico cell 9 (step S3).

The cell selection coefficient calculation unit 23 determines a cell selection coefficient f_Macrocell=M_RSRP× Ra_Macrocell of the macro cell 8 (step S4).

The cell selection coefficient calculation unit 23 transfers the determined cell selection coefficients f_Macrocell and f_Picocell to the cell selection processing unit 24 (step S5).

Figure 4:
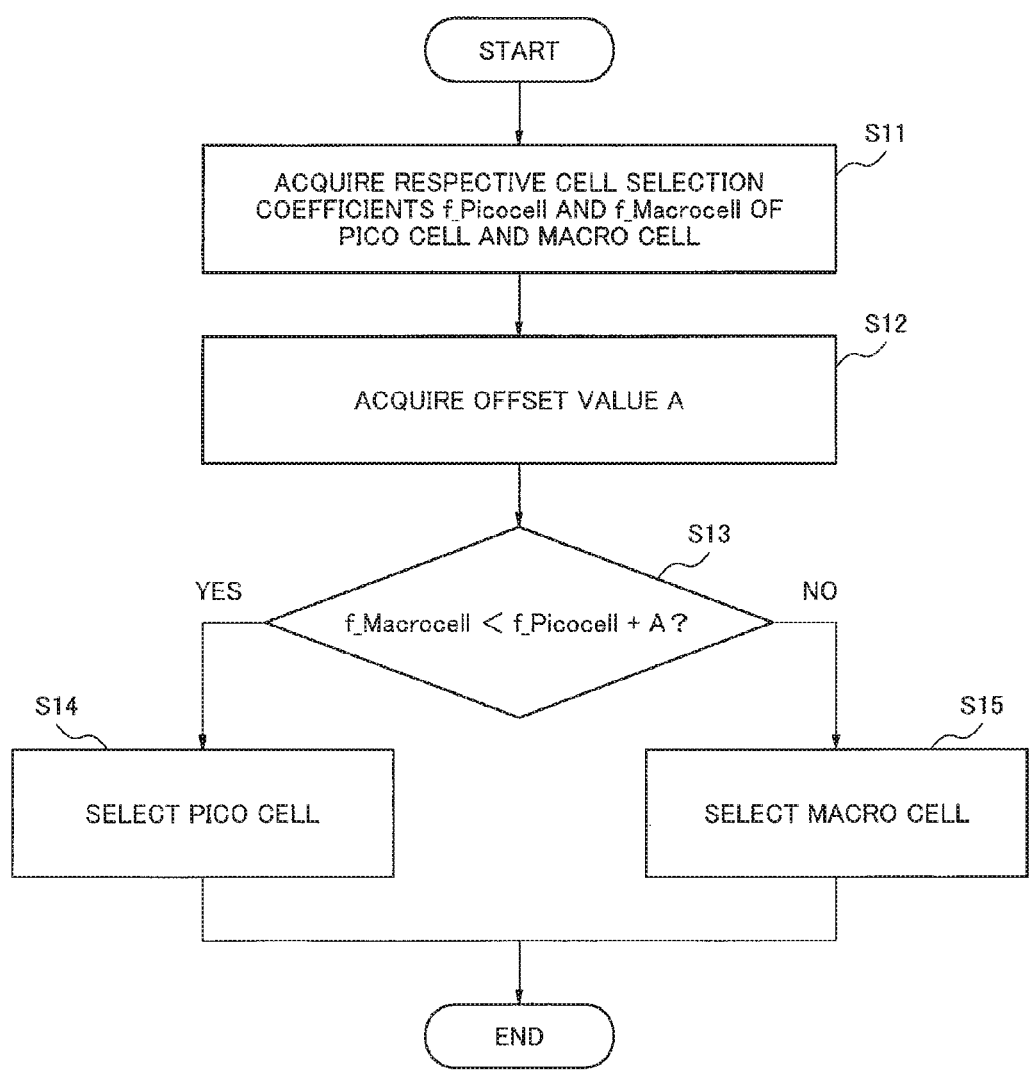
FIG. 4 is a flowchart for illustrating an operation example of a cell selection processing unit illustrated in FIG. 2.

FIG. 4 is a flowchart for illustrating an operation example of the cell selection processing unit 24 illustrated in FIG. 2.

The cell selection processing unit 24 receives the cell selection coefficients f_Macrocell and f_Picocell from the cell selection coefficient calculation unit 23 (step S11).

The cell selection processing unit 24 acquires an offset value A from a storage circuit included in the own unit or an external storage device (step S12). The offset value A is an optional constant previously set.

The cell selection processing unit 24 selects any one of the macro cell 8 and the pico cell 9 on the basis of the cell selection coefficients f_Picocell and f_Macrocell and the offset value A.

Specifically, the cell selection processing unit 24 compares a magnitude of a sum (f_Picocell+A) of the cell selection coefficient f_Picocell of the pico cell 9 and the offset value A and a magnitude of the cell selection coefficient f_Macrocell of the macro cell 8 (step S13).

When the sum f_Picocell+A is greater than the f_Macrocell ("Yes" in step S13), the cell selection processing unit 24 outputs a cell selection signal indicating that as a connection destination of the UE 4, the pico cell 9 is selected (step S14).

On the other hand, when the sum f_Picocell+A is equal to or smaller than the f_Macrocell ("No" in step S13), the cell selection processing unit 24 outputs a cell selection signal indicating that as a connection destination of the UE 4, the macro cell 8 is selected (step S15).

(Description of an Advantageous Effect)

In the first exemplary embodiment described above, the UE 4 selects, of the macro cell 8 and the pico cell 9, a cell having better wireless quality and a larger usable frequency resource number as a connection destination. Therefore, it is possible to effectively distribute a load of the macro cell base station 2 without decreasing a communication rate of the UE 4.

[Second Exemplary Embodiment]

In the first exemplary embodiment, to balance maintenance of a communication rate of a UE and load distribution of a macro cell base station, no control for suppressing cell switching is executed. However, on the other hand, when cell switching is controlled not to be suppressed, cell switching is frequently executed, and therefore there may occur another problem in which as the entire system, a processing load (e.g. cell selection processing executed in a UE or handover processing of a base station) increases.

Therefore, an object of a second exemplary embodiment is to suppress an increase in a processing load of the entire system with achieving maintenance of a communication rate of a UE and load distribution of a macro cell base station.

(Description of a Configuration)

Figure 5:
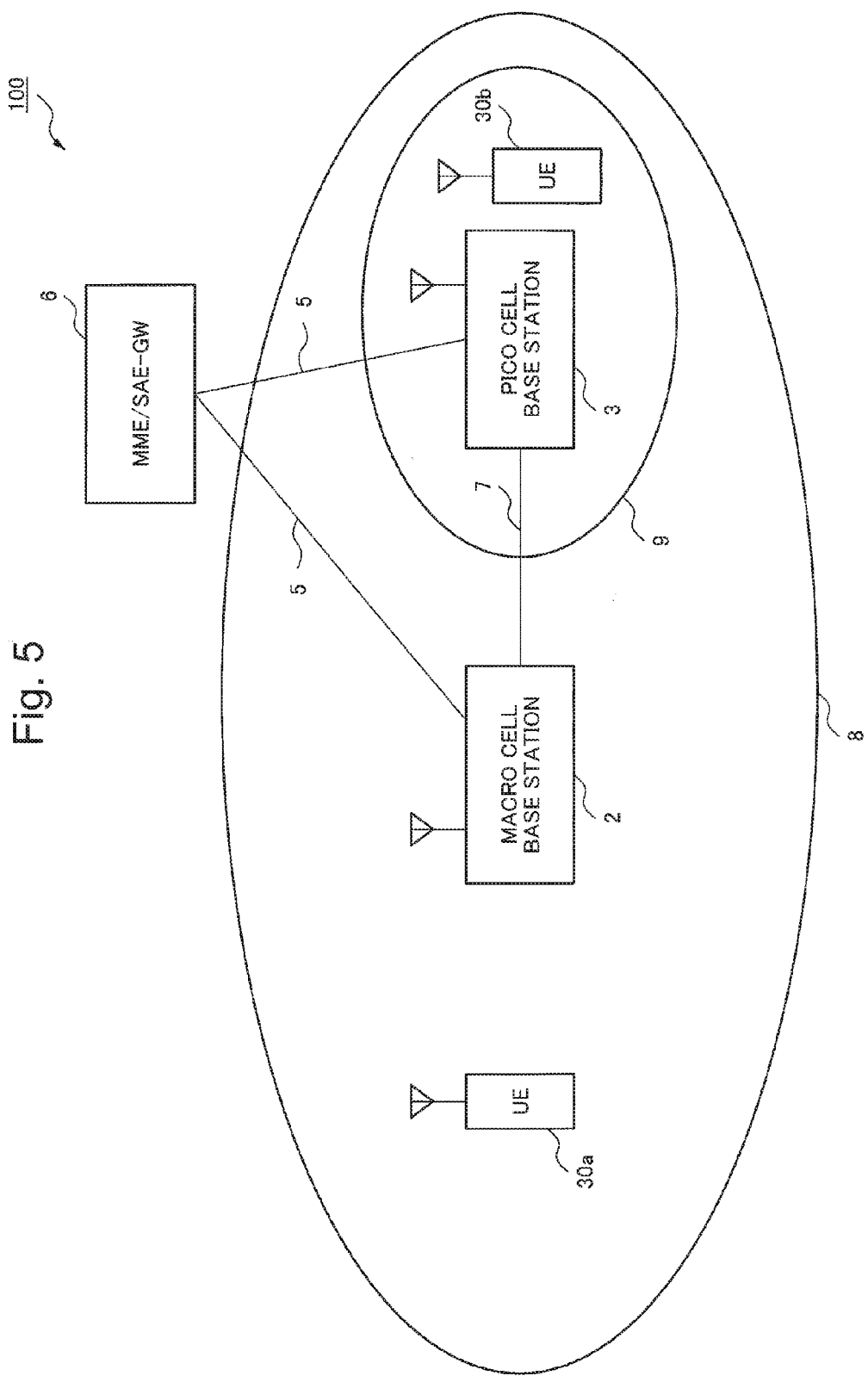
FIG. 5 is a block diagram illustrating a configuration example of a wireless communication system according to a second exemplary embodiment of the present invention.

FIG. 5 is a block diagram illustrating a configuration example of a wireless communication system 100 according to the second exemplary embodiment of the present invention. The wireless communication system 100 includes a UE 30 (in FIG. 5, a UE 30a and a UE 30b are illustrated) instead of the UE 4 of the first exemplary embodiment. A feature of the UE 30 is schematically to set a forgetting factor (details thereof will be described later) in accordance with the number of times of cell selection and change an influence degree of a cell selection coefficient calculated last time on a cell selection coefficient calculated this time in accordance with the forgetting factor.

Figure 6:
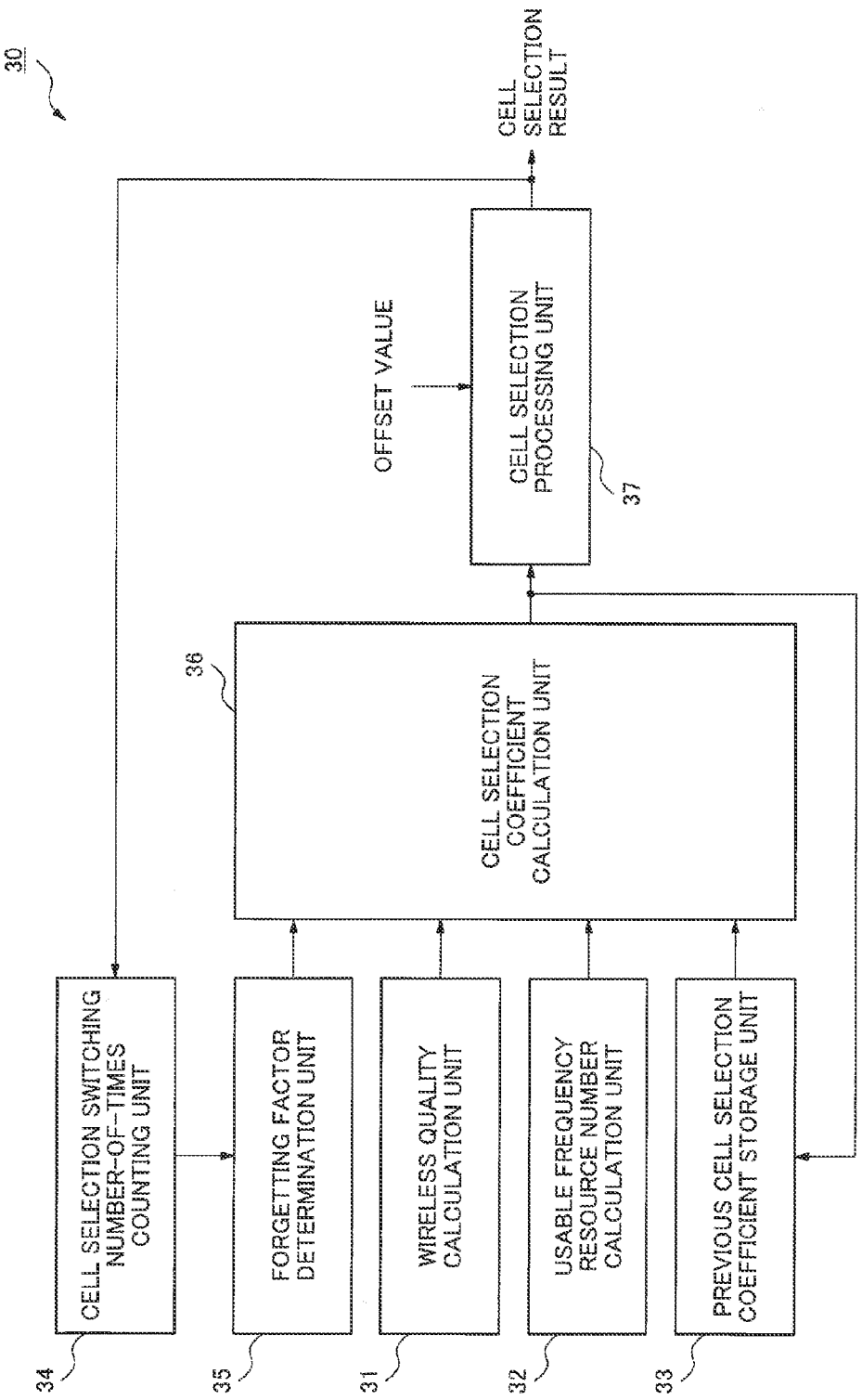
FIG. 6 is a block diagram illustrating a configuration example of a UE illustrated in FIG. 5.

FIG. 6 is a block diagram illustrating a configuration example of the UE 30 illustrated in FIG. 5. The UE 30 includes wireless quality calculation unit 31, a usable frequency resource number calculation unit 32, a previous cell selection coefficient storage unit 33, a cell selection switching number-of-times counting unit 34, a forgetting factor determination unit 35, a cell selection coefficient calculation unit 36, and a cell selection processing unit 37. The components of the UE 30 each may be realized as a dedicated circuit or may be realized via operations of a processing device, not illustrated, included in the UE 30 in accordance with a program.

The wireless quality calculation unit 31 is the same as the wireless quality calculation unit 21 illustrated in FIG. 2, and the usable frequency resource number calculation unit 32 is the same as the usable frequency resource number calculation unit 22 illustrated in FIG. 2. Therefore, description thereof will be omitted.

The previous cell selection coefficient storage unit 33 receives and stores a cell selection coefficient f_Macrocell of the macro cell 8 and a cell selection coefficient f_Picocell of the pico cell 9 calculated by the cell selection coefficient calculation unit 36 to be described later. In this case, the previous cell selection coefficient storage unit 33 stores the respective cell selection coefficients until at least next cell selection coefficients are calculated. When the next cell selection coefficients are calculated by the cell selection coefficient calculation unit 36, the previous cell selection coefficient storage unit 33 transfers the stored previous cell selection coefficients f_Macrocell and f_Picocell to the cell selection coefficient calculation unit 36.

The cell selection switching number-of-times counting unit 34 counts the switching number of times N (hereinafter, referred to as "cell switching number of times N") of a selected cell in a predetermined period of time on the basis of a cell selection result output by the cell selection processing unit 37 which will be described later. In other words, the cell switching number of times N is a sum of the switching number of times of a selected cell from a pico cell to a macro cell and the switching number of times of the selected cell from the macro cell to the pico cell. When, for example, a certain period of time starts from a state of selecting the pico cell, then moves to a state of selecting the macro cell, and lastly reaches a state of selecting the pico cell, the cell switching number of times N of the period of time is twice.

The forgetting factor determination unit 35 determines a forgetting factor λ in accordance with the cell switching number of times N output by the cell selection switching number-of-times counting unit 34.

For example, in a case of N=0, the forgetting factor determination unit 35 sets the forgetting factor λ to be "0." In a case of 1≤N<M, the forgetting factor determination unit 35 sets the forgetting factor λ to be "a." In a case of M≤N, the forgetting factor determination unit 35 sets the forgetting factor λ to be "b."

However, in the above description, a and b establish a relation of 0<a<b<1, and the cell switching number of times N is the cell switching number of times measured in a latest time interval TT. The time interval TT is, for example, 10 minutes per interval. Further, in the above description, M is an optional integer previously set.

In other words, the forgetting factor λ is a coefficient in which a cell switching frequency (the cell switching number of times per predetermined period of time, e.g. 10 minutes) is represented by a value between 0 and 1.

The cell selection coefficient calculation unit 36 calculates respective cell selection coefficients f_Macrocell and f_Picocell for the macro cell 8 and the pico cell 9 on the basis of the outputs of the wireless quality calculation unit 31, the usable frequency resource number calculation unit 32, the previous cell selection coefficient storage unit 33, and the forgetting factor determination unit 35.

The cell selection coefficient calculation unit 36 calculates a cell selection coefficient f_Picocell(t) for the pico cell 9 on the basis of following Equation 1. In FIG. 1, t is a variable representing one of a plurality of continuous periods of time. Herein, t represents a current cell selection period of time and t−1 represents a last cell selection period of time.

$$f\_Picocell(t)=\lambda \times f\_Picocell(t-1)+(1-\lambda)\times[Nrb-\alpha(T)]\times P\_RSRP(i) \quad \text{(Equation 1)}$$

The cell selection coefficient calculation unit 36 calculates a cell selection coefficient f_Macrocell(t) for the macro cell 8 on the basis of following Equation 2.

$$f\_Macrocell(t)=\lambda \times f\_Macrocell(t-1)+(1-\lambda)\times [Nrb-\beta(T)]\times M\_RSRP(i) \quad \text{(Equation 2)}$$

The cell selection coefficient calculation unit 36 transfers the calculated cell selection coefficients f_Macrocell and f_Picocell to the previous cell selection coefficient storage unit 33 and the cell selection processing unit 37. The previous cell selection coefficient storage unit 33 deletes the currently stored cell selection coefficients f_Macrocell and f_Picocell and stores the received cell selection coefficients f_Macrocell and f_Picocell instead thereof.

(Description of Operations)

Figure 7:
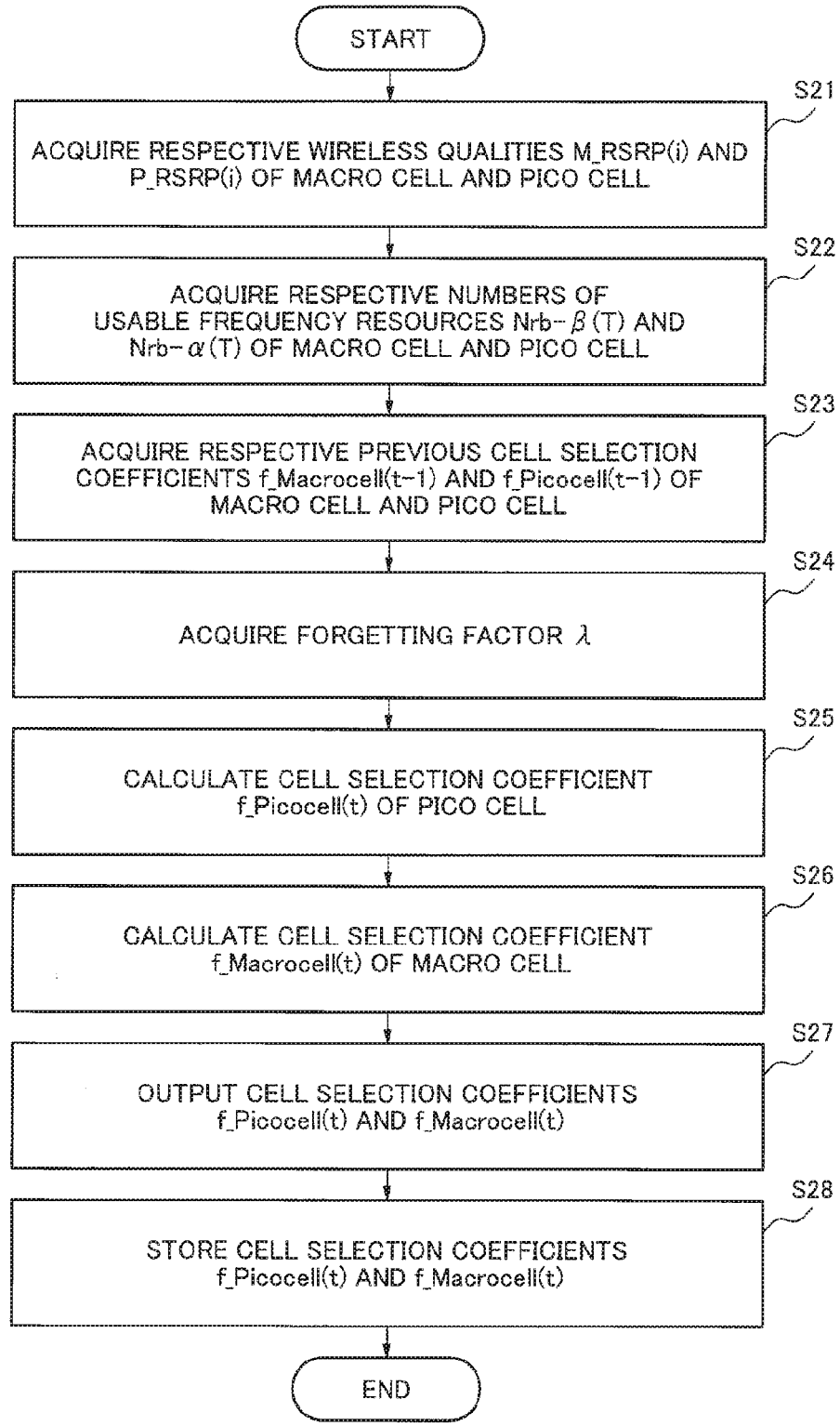
FIG. 7 is a flowchart for illustrating an operation example of a cell selection coefficient calculation unit illustrated in FIG. 6.

FIG. 7 is a flowchart for illustrating an operation example of the cell selection coefficient calculation unit 36 illustrated in FIG. 6.

The cell selection coefficient calculation unit 36 acquires, for example, RSRPs as values representing respective wireless qualities of the macro cell 8 and the pico cell 9 from the wireless quality calculation unit 31 (step S21). In a UE(i) of an identifier i, an RSRP of the macro cell 8 is designated as an M_RSRP(i) and an RSRP of the pico cell 9 is designated as a P_RSRP(i).

The cell selection coefficient calculation unit 36 acquires a usable frequency resource number Nrb_β(T) of the macro cell 8 and a usable frequency resource number Nrb_α(T) of the pico cell 9 from the usable frequency resource number calculation unit 32 (step S22).

The cell selection coefficient calculation unit 36 acquires respective previous cell selection coefficients f_Macrocell (t−1) and f_Picocell(t−1) of the macro cell 8 and the pico cell 9 from the previous cell selection coefficient storage unit 33 (step S23).

The cell selection coefficient calculation unit 36 acquires a forgetting factor λ from the forgetting factor determination unit 35 (step S24).

The cell selection coefficient calculation unit 36 substitutes the acquired values into Equation 1 and Equation 2 described above and calculates a current cell selection coefficient f_Picocell(t) for the pico cell 9 and a current cell selection coefficient f_Macrocell(t) for the macro cell 8, respectively (steps S25 and S26).

The cell selection coefficient calculation unit 36 transfers the cell selection coefficients f_Macrocell(t) and f_Picocell (t) to the cell selection processing unit 37 (step S27).

The cell selection coefficient calculation unit 36 stores the cell selection coefficients f_Macrocell(t) and f_Picocell(t) on the previous cell selection coefficient storage unit 33 (step S28). The previous cell selection coefficient storage unit 33 rewrites the currently stored previous cell selection coefficients f_Macrocell(t−1) and f_Picocell(t−1) to the current cell selection coefficients f_Macrocell(t) and f_Picocell(t).

The cell selection processing unit 37 executes an output for selecting any one of the macro cell 8 and the pico cell 9 on the basis of the cell selection coefficients f_Picocell and f_Macrocell transferred from the cell selection coefficient calculation unit 36. An operation of the cell selection processing unit 37 is the same as in the cell selection processing unit 24 already described, except the last processing. In other words, referring to FIG. 4, the cell selection processing unit 37 executes the same processing as steps S11 to S13. In steps S14 and S15, the cell selection processing unit 37 not only outputs a cell selection signal to the outside but also transfers the signal to the cell selection switching number-of-times counting unit 34.

(Description of an Advantageous Effect)

In the second exemplary embodiment described above, the UE 30 executes cell selection on the basis of a cell selection coefficient f_Picocell calculated by Equation 1 and a cell selection coefficient f_Macrocell calculated by Equation 2. In Equation 1 and Equation 2, as a forgetting factor λ becomes larger (i.e. as a cell switching frequency becomes higher), an influence of a cell selection coefficient in a period of time t−1 (i.e. a last cell selection period of time) becomes stronger. This means that when the UE 30 is connected to either the macro cell 8 or the pico cell 9 in the period of time t-1, a connection state of the UE 30 and a cell during the connection is easily maintained.

In other words, in the second exemplary embodiment, cell selection processing is executed using a cell selection coefficient strongly subjected to an influence of a cell selection coefficient in a period of time t-1, and therefore the same result as a cell selection processing result obtained using the cell selection coefficient of the period of time t-1 is easily obtained. In other words, a state of a last cell selection period of time is easily maintained, and, as a result, it is possible to suppress cell selection switching from occurring.

Summarizing the above, according to the second exemplary embodiment, it is possible to suppress an increase in a processing load of the entire system with achieving maintenance of a communication rate of a UE and load distribution of a macro cell base station.

[Third Exemplary Embodiment]

In general, an upper limit of an accommodated-UE number in a pico cell is smaller than an upper limit of an accommodated-UE number in a macro cell. Therefore, when high-density traffic occurs locally in the pico cell, the number of accommodated-UEs in the pico cell easily reaches the upper limit.

A case is assumed in which in a situation where an accommodated-UE number reaches an upper limit and there is no vacancy in a pico cell, a UE attempting to be newly connected (hereinafter, referred to as a "new UE") has selected the pico cell as a connection destination thereof. In the case, as described above, there is no vacancy in the pico cell, and therefore it is difficult for the UE to be actually connected to the pico cell while the pico cell has been selected as the connection destination. Such cell selection causes a decrease in a connection chance of the UE.

Therefore, an object of a third exemplary embodiment is to suppress a decrease in a connection chance of a UE with achieving maintenance of a communication rate of the UE and load distribution of a macro cell base station.

(Description of a Configuration)

Figure 8:
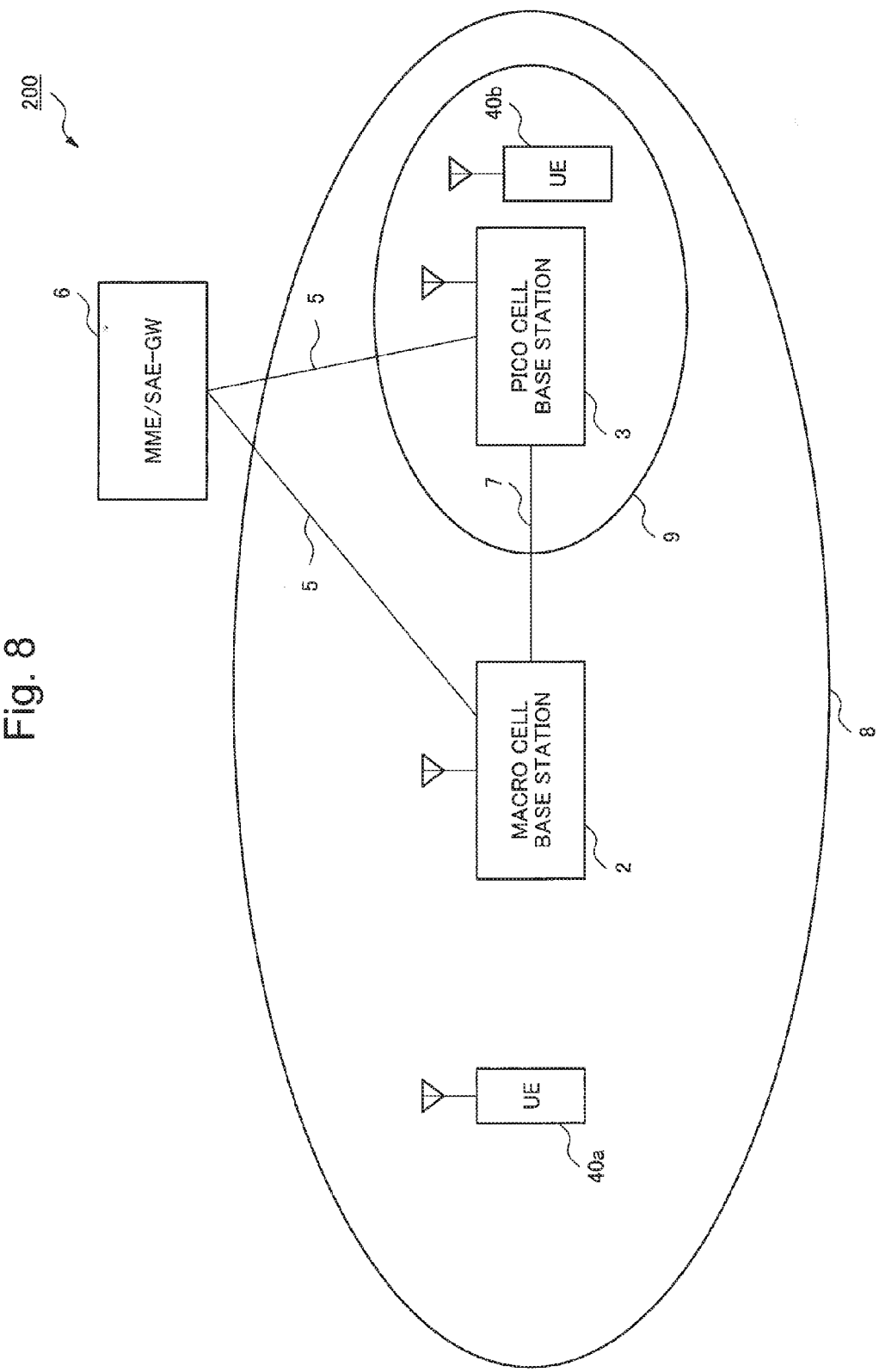
FIG. 8 is a block diagram illustrating a configuration example of a wireless communication system according to a third exemplary embodiment of the present invention.

FIG. 8 is a block diagram illustrating a configuration example of a wireless communication system 200 according to the third exemplary embodiment of the present invention. As illustrated in FIG. 8, the wireless communication system 200 includes a UE 40 instead of the UE 4 of the first exemplary embodiment.

Figure 9:
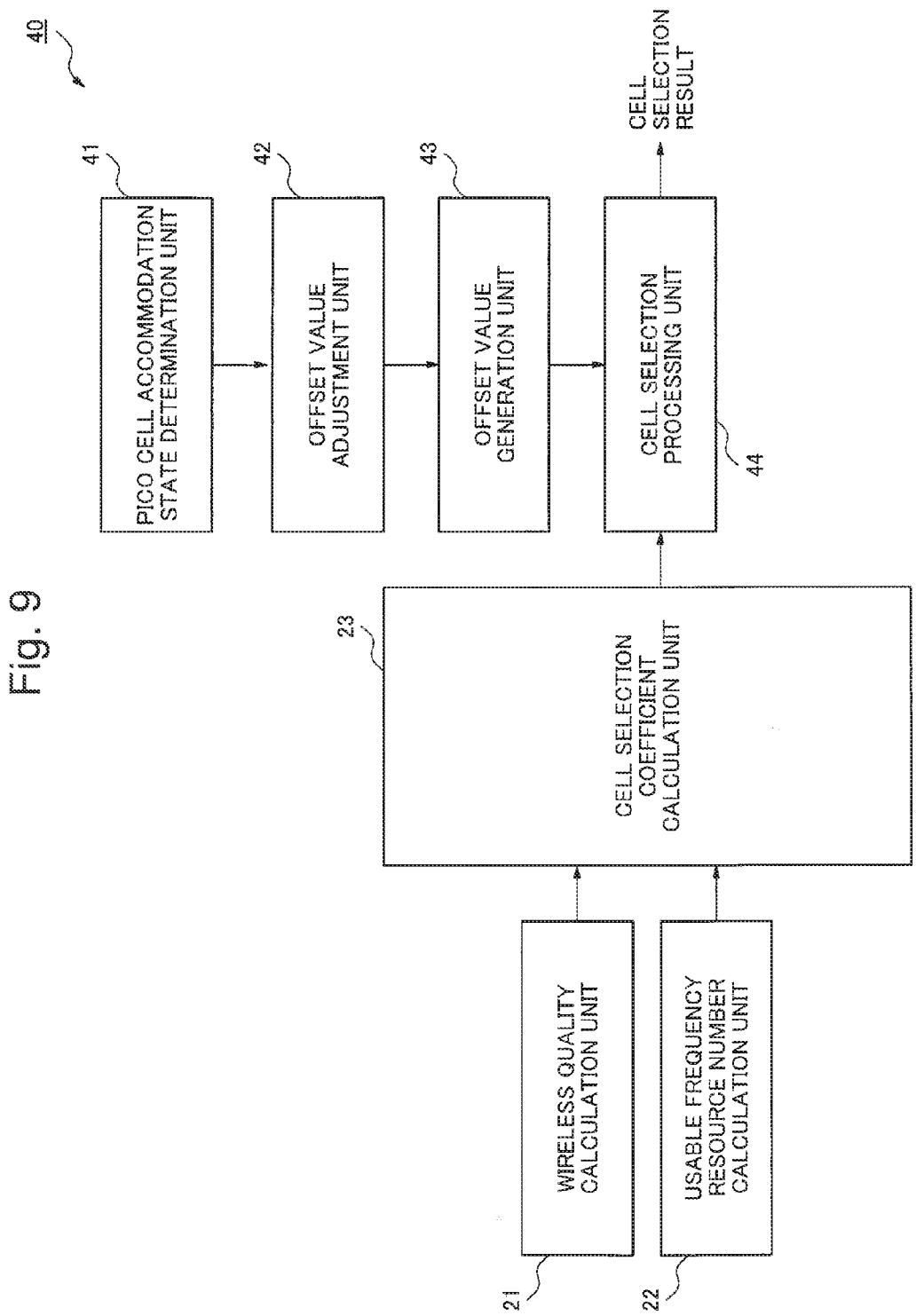
FIG. 9 is a block diagram illustrating a configuration example of a UE illustrated in FIG. 8.

FIG. 9 is a block diagram illustrating a configuration example of the UE 40 illustrated in FIG. 8. While the UE 4 of the first exemplary embodiment executes cell selection processing using a predetermined offset value, the UE 40 executes cell selection processing using an offset value determined in accordance with the number of current accommodated-terminals in a pico cell. Therefore, the UE 40 further includes a pico cell accommodation state determination unit 41, an offset value adjustment unit 42, and an offset value generation unit 43, in addition to the wireless quality calculation unit 21, the usable frequency resource number calculation unit 22, and the cell selection coefficient calculation unit 23 included in the UE 4. Further, the UE 40 includes a cell selection processing unit 44 instead of the cell selection processing unit 24. The components of the UE 40 each may be realized as a dedicated circuit or may be realized via operations of a processing device, not illustrated, included in the UE 40 in accordance with a program.

As described above, the wireless quality calculation unit 21, the usable frequency resource number calculation unit 22, and the cell selection coefficient calculation unit 23 are the same as the respective corresponding components of the UE 4, and therefore description thereof will be omitted.

(Description of an Advantageous Effect)

Figure 10:
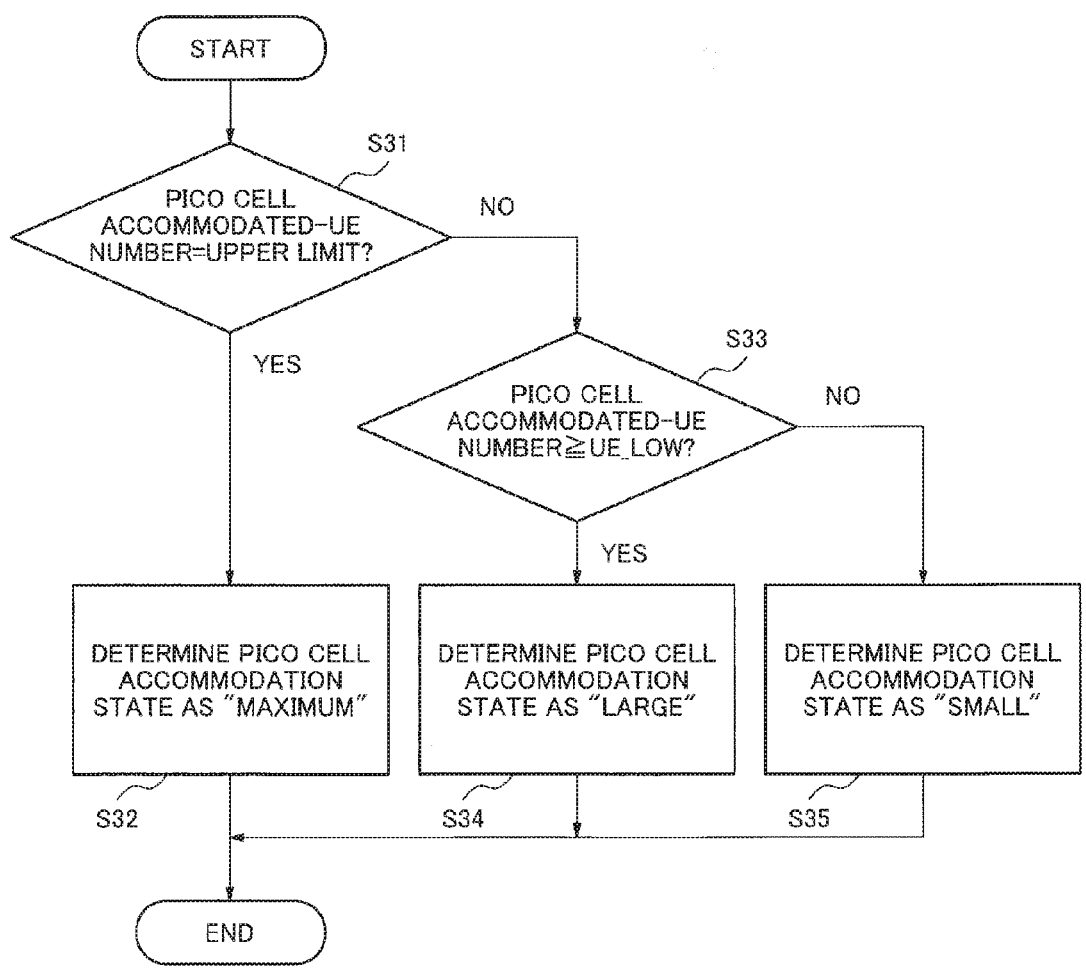
FIG. 10 is a flowchart for illustrating an operation example of a pico cell accommodation state determination unit illustrated in FIG. 9.

FIG. 10 is a flowchart for illustrating an operation example of the pico cell accommodation state determination unit 41 illustrated in FIG. 9.

The pico cell accommodation state determination unit 41 determines a magnitude of the number of UEs being currently accommodated in the pico cell 9. Specifically, the pico cell accommodation state determination unit 41 determines the number of UEs being accommodated, for example, as any one of three stages of "maximum," "large," and "small" and outputs the determination result as a pico cell accommodation state.

For the pico cell 9, an upper limit of the number of UEs able to be accommodated (a pico cell accommodated-UE upper limit) is previously determined. The pico cell accommodation state determination unit 41 determines whether the number of UEs being currently accommodated in the pico cell 9 (a pico cell accommodated-UE number) coincides with the pico cell accommodated-UE upper limit (Step S31).

When the pico cell accommodated-UE number has reached the pico cell accommodated-UE upper limit ("Yes" in step S31), the pico cell accommodation state determination unit 41 determines the pico cell accommodation state as "maximum" (step S32).

On the other hand, when the pico cell accommodated-UE number does not coincide with the pico cell accommodated-UE upper limit ("No" in step S31), the pico cell accommodation state determination unit 41 compares a magnitude of the pico cell accommodated-UE number and a magnitude of a threshold UE_low (step S33). The UE_low is an integer equal to or greater than 0 previously set, and when the pico cell accommodated-UE number is smaller than this value, the pico cell is determined as having a margin in an accommodation number thereof.

When the pico cell accommodated-UE number is equal to or greater than the UE_low ("Yes" in step S33), the pico cell accommodation state determination unit 41 determines the pico cell accommodation state as "large" (step S34).

When the pico cell accommodated-UE number is smaller than the UE_low ("No" in step S33), the pico cell accommodation state determination unit 41 determines the pico cell accommodation state as "small" (step S35).

Figure 11:
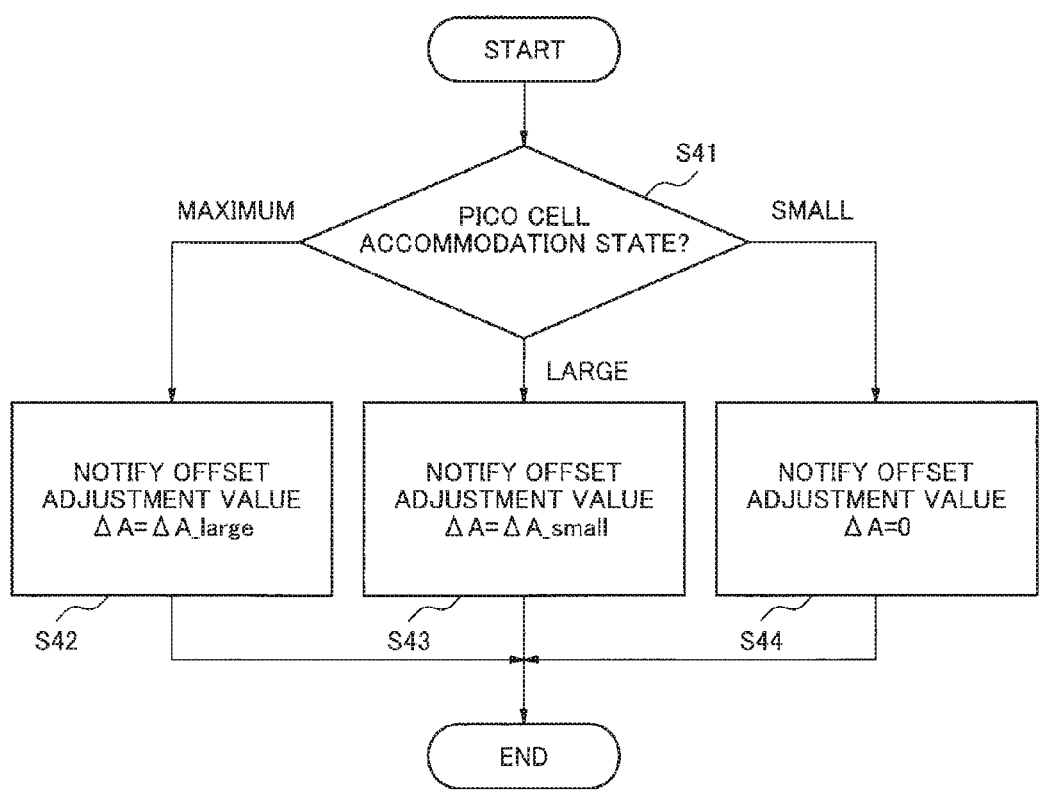
FIG. 11 is a flowchart for illustrating an operation example of an offset value adjustment unit illustrated in FIG. 9.

FIG. 11 is a flowchart for illustrating an operation example of the offset value adjustment unit 42 illustrated in FIG. 9.

Initially, the offset value adjustment unit 42 previously stores an offset value adjustment table as in Table 1.

TABLE 1

| Pico cell accommodation state | Maximum | Large | Small |
|---|---|---|---|
| Offset adjustment value ($\Delta A$) | $\Delta A\_large$ | $\Delta A\_small$ | 0 |

(Note)
$\Delta A\_large > \Delta A\_small > 0$

The offset value adjustment unit 42 refers to the offset value adjustment table and thereby outputs an offset adjustment value $\Delta A$ corresponding to a pico cell accommodation state received from the pico cell accommodation state determination unit 41. In other words, the offset value adjustment unit 42 determines to which one of "maximum," "large," and "small" the pico cell accommodation state corresponds (step S41).

When the pico cell accommodation state is "maximum" ("maximum" in step S41), the offset value adjustment unit 42 outputs ΔA_large as the offset value ΔA to the offset value generation unit 43 (step S42).

When the pico cell accommodation state is "large" ("large" in step S41), the offset value adjustment unit 42 outputs ΔA_small as the offset value ΔA to the offset value generation unit 43 (step S43).

When the pico cell accommodation state is "small" ("small" in step S41), the offset value adjustment unit 42 outputs 0 as the offset value ΔA to the offset value generation unit 43 (step S44).

Figure 12:
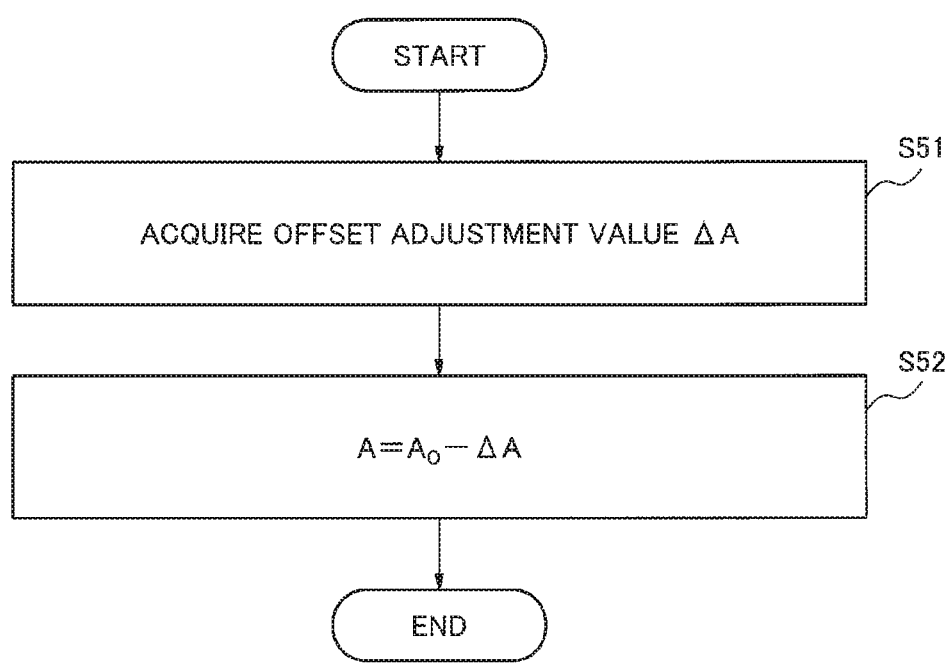
FIG. 12 is a flowchart for illustrating an operation example of an offset value generation unit illustrated in FIG. 9.
Figure 13:
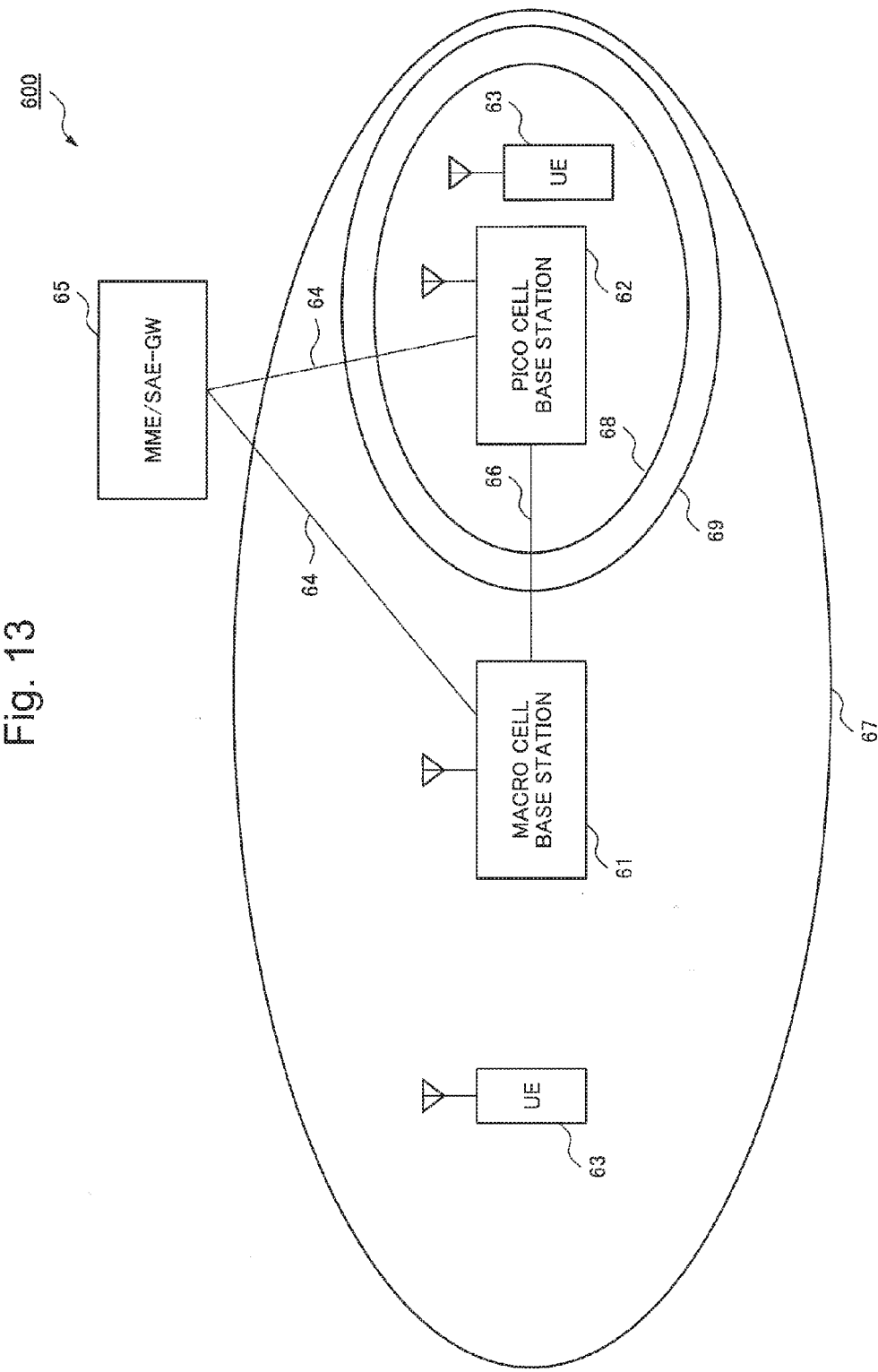
FIG. 13 is a configuration diagram of a common wireless communication system in a heterogeneous network.

FIG. 12 is a flowchart for illustrating an operation example of the offset value generation unit 43 illustrated in FIG. 9.

As an assumption, the offset value generation unit 43 previously stores an initial offset value $A_O$.

The offset value generation unit 43 acquires an offset adjustment value ΔA from the offset value adjustment unit 42 (step S51).

The offset value generation unit 43 subtracts the offset adjustment value ΔA from the initial offset value $A_O$ and thereby updates an offset value (step S52). In other words, the offset value generation unit 43 calculates "an offset value A=an initial offset value $A_O$—an offset adjustment value ΔA."

Next, an operation of the cell selection processing unit 44 will be described. The operation of the cell selection processing unit 44 is basically the same as the operation of the cell selection processing unit 24 in the first exemplary embodiment. However, there is a difference only in a point in which an offset value acquired in step S12 in FIG. 4 is received from the offset value generation unit 43.

(Description of an Advantageous Effect)

In the third exemplary embodiment described above, the UE 40 selects, of the macro cell 8 and the pico cell 9, a cell having better wireless quality and a larger usable frequency resource number as a connection destination. Therefore, it is possible to effectively distribute a load of the macro cell base station 2 without decreasing a communication rate of the UE 40.

Further, in the third exemplary embodiment, the UE 40 adjusts an offset value A to be added to a cell selection coefficient f_Picocell of a pico cell in accordance with the number of UEs being currently accommodated in the pico cell 9. Specifically, when, for example, a pico cell accommodated-UE number is large, an offset value A is decreased, and when the pico cell accommodated-UE number is small, the offset value A is increased. Thereby, when the pico cell accommodated-UE number is large in the conditional branching of step S13 in FIG. 4, a macro cell is easily selected, and conversely, when the pico cell accommodated-UE number is small, a pico cell is easily selected.

In a state where there is no vacancy in a pico cell accommodated-UE number, when a UE newly appears in a vicinity of the center of the pico cell 9 or when there is a UE having moved from the macro cell 8 to the pico cell 9, it is difficult to connect such a UE to the pico cell 9. Therefore, when there is no vacancy in the pico cell accommodated-UE number or when the vacancy is small, an offset adjustment value ΔA is increased and thereby an offset value A itself is decreased. Then, while a UE having poor wireless quality caused by a reason such as a location in a vicinity of the cell edge of the pico cell 9 is easily offloaded to the macro cell 8, a UE having better wireless quality is preferentially connected to the pico cell 9. Conversely, in a state where there is room in the pico cell accommodated-UE number, an offset adjustment value ΔA is set to be 0 and an offset initial value $A_O$ is used as an offset value A as is, and thereby traffic of the macro cell 8 is easily offloaded to the pico cell 9.

Thereby, traffic of the macro cell 8 can be distributed in accordance with the number of UEs being currently accommodated in the pico cell 9.

Summarizing the above, according to the third exemplary embodiment, it is possible to suppress a decrease in a connection chance of a UE with achieving maintenance of a communication rate of the UE and load distribution of a macro cell base station.

(Description of Modified Examples)

In the first to third exemplary embodiments described above, a combination of a macro cell and a pico cell is illustrated, but a combination of cells is not limited to the above. The combination of cells may be any combination when a cell is combined with another cell in which cell radii thereof are different from each other, for example. The combination may be, for example, a combination of a macro cell and a micro cell or a combination of a macro cell and a femto cell.

Further, in the first to third exemplary embodiments described above, a cell configuration in which the entire pico cell is completely included in a macro cell is illustrated, but the cell configuration is not limited to the above. The cell configuration may be, for example, a cell configuration in which a part of a pico cell and a part of a macro cell are overlapped with each other. In this case, cell radii thereof are not necessarily different.

[Fourth Exemplary Embodiment]

Figure 14:
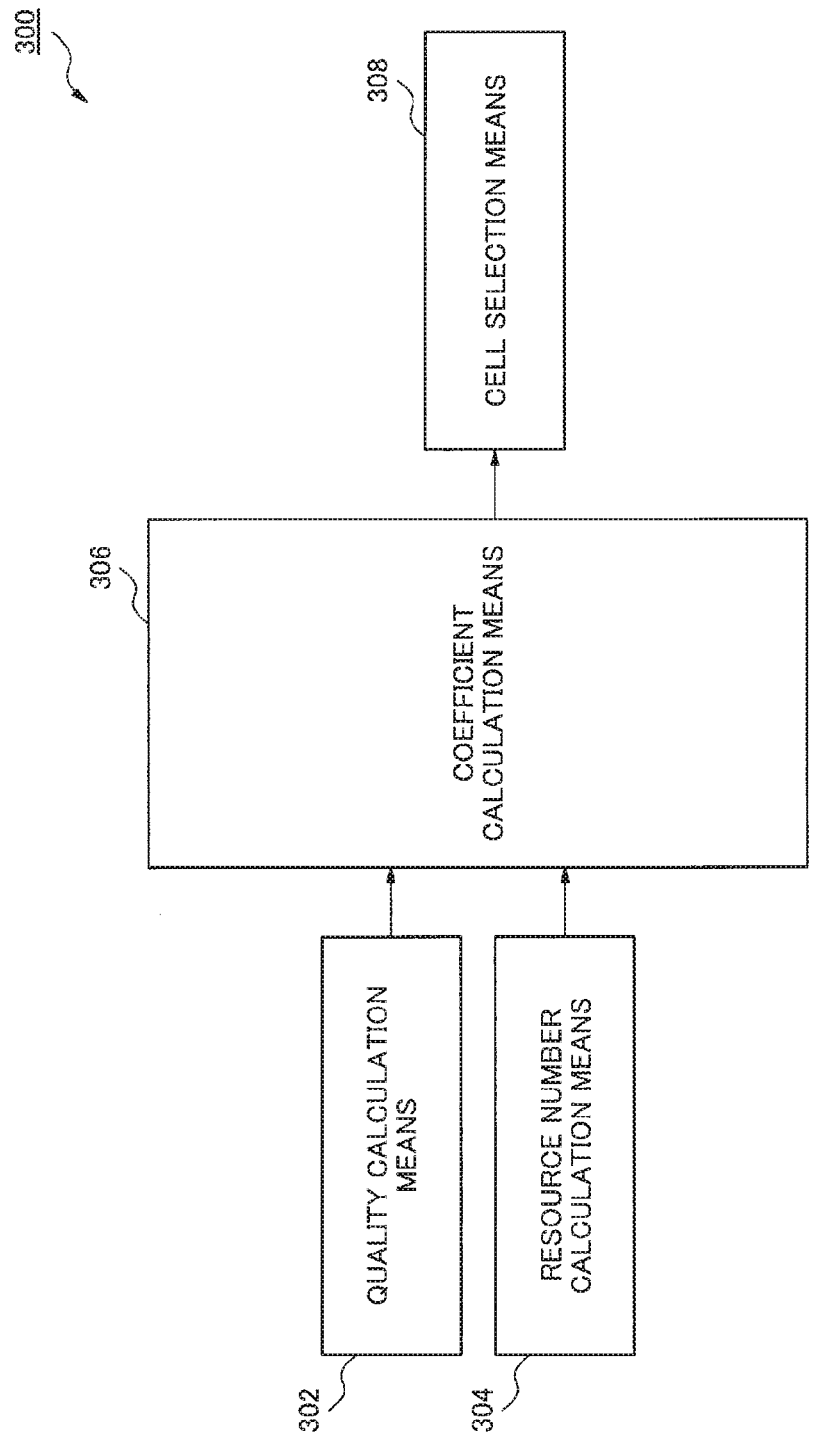
FIG. 14 is a block diagram illustrating a configuration example of a wireless communication terminal according to a fourth exemplary embodiment of the present invention.

FIG. 14 is a block diagram illustrating a configuration example of a wireless communication terminal 300 according to a fourth exemplary embodiment of the present invention.

The wireless communication terminal 300 includes a first cell and a second cell and is used in a network in which one cell is included in the other cell or parts of both cells are overlapped with each other.

The wireless communication terminal 300 includes a quality calculation means 302, a resource number calculation means 304, a coefficient calculation means 306, and a cell selection means 308.

The quality calculation means 302 determines first quality that is wireless quality of the first cell and second quality that is wireless quality of the second cell.

The resource number calculation means 304 determines a first resource number that is the number of usable frequency resources in the first cell and a second resource number that is the number of usable frequency resources in the second cell.

The coefficient calculation means 306 determines a first cell selection coefficient that is a cell selection coefficient for the first cell on the basis of the first quality and the first resource number and a second cell selection coefficient that is a cell selection coefficient for the second cell on the basis of the second quality and the second resource number.

The cell selection means 308 selects any one of the first cell and the second cell on the basis of the first cell selection coefficient and the second cell selection coefficient.

In the fourth exemplary embodiment described above, the wireless communication terminal 300 selects, of the first cell and the second cell, a cell having better wireless quality and a larger usable frequency resource number as a connection destination. Therefore, it is possible to effectively distribute a load of one cell to the other cell without decreasing a communication rate of the wireless communication terminal 300.

A part or all of the exemplary embodiments can be described as the following supplementary notes, but the present invention is not limited thereto.

(Supplementary Note 1)

A wireless communication terminal used in a wireless network including a first cell and a second cell each including a common portion, the terminal including:

a quality calculation means for determining first quality that is wireless quality of the first cell and second quality that is wireless quality of the second cell;

a resource number calculation means for determining a first resource number that is the number of usable frequency resources in the first cell and a second resource number that is the number of usable frequency resources in the second cell;

a coefficient calculation means for determining a first cell selection coefficient that is a cell selection coefficient for the first cell on the basis of a result obtained by calculating the first quality and the first resource number and determining a second cell selection coefficient that is a cell selection coefficient for the second cell on the basis of a result obtained by calculating the second quality and the second resource number; and a cell selection means for selecting any one of the first cell and the second cell on the basis of a result obtained by calculating the first cell selection coefficient and the second cell selection coefficient.

(Supplementary Note 2)

The wireless communication terminal according to Supplementary Note 1, further including a storage means for storing the first cell selection coefficient and the second cell selection coefficient, calculated last time, wherein the coefficient calculation means determines the first cell selection coefficient on the basis of the first quality, the first resource number, and the first cell selection coefficient calculated last time, and determines the second cell selection coefficient on the basis of the second quality, the second resource number, and the second cell selection coefficient calculated last time.

(Supplementary Note 3)

The wireless communication terminal according to Supplementary Note 2, further including:

a number-of-times calculation means for determining the cell switching number-of-times in a predetermined period of time; and a coefficient setting means for setting, on the basis of the cell switching number-of-times, a forgetting factor that is a value representing a cell switching frequency in the predetermined period of time, wherein the coefficient calculation means changes, in accordance with the forgetting factor, an influence degree of the first cell selection coefficient calculated last time on the first cell selection coefficient, and changes, in accordance with the forgetting factor, an influence degree of the second cell selection coefficient calculated last time on the second cell selection coefficient.

(Supplementary Note 4)

The wireless communication terminal according to any one of Supplementary Notes 1 to 3, wherein the cell selection means compares a magnitude of the first cell selection coefficient with a magnitude of a value obtained by adding a predetermined offset value to the second cell selection coefficient, and selects a cell in accordance with the comparison result.

(Supplementary Note 5)

The wireless communication terminal according to Supplementary Note 4, further including an offset calculation means for determining the offset value in accordance with the number of current accommodated-terminals in any one of the first cell and the second cell.

(Supplementary Note 6)

The wireless communication terminal according to Supplementary Note 5, wherein the offset calculation means divides the number of accommodated-terminals into a plurality of divisions, sets an offset adjustment value in accordance with the division, and subtracts the offset adjustment value from an initial offset value previously determined, to determine the offset value.

(Supplementary Note 7)

A wireless communication system including:

the wireless communication terminal according to any one of Supplementary Notes 1 to 6;

a first base station that forms the first cell; and a second base station that forms the second cell.

(Supplementary Note 8)

A storage medium storing a cell selection program for causing a computer of a wireless communication terminal used in a wireless network including a first cell and a second cell each including a common portion, to execute:

a quality calculation function of determining first quality that is wireless quality of the first cell and second quality that is wireless quality of the second cell;

a resource number calculation function of determining a first resource number that is the number of usable frequency resources in the first cell and a second resource number that is the number of usable frequency resources in the second cell;

a coefficient calculation function of determining a first cell selection coefficient that is a cell selection coefficient for the first cell on the basis of a result obtained by calculating the first quality and the first resource number and determining a second cell selection coefficient that is a cell selection coefficient for the second cell on the basis of a result obtained by calculating the second quality and the second resource number; and a cell selection function of selecting any one of the first cell and the second cell on the basis of a result obtained by calculating the first cell selection coefficient and the second cell selection coefficient.

(Supplementary Note 9)

The storage medium according to Supplementary Note 8, wherein the cell selection program further includes a storage function of storing the first cell selection coefficient and the second cell selection coefficient, calculated last time, and the coefficient calculation function determines the first cell selection coefficient on the basis of the first quality, the first resource number, and the first cell selection coefficient calculated last time, and determines the second cell selection coefficient on the basis of the second quality, the second resource number, and the second cell selection coefficient calculated last time.

(Supplementary Note 10)

The storage medium according to Supplementary Note 9, wherein the cell selection program further includes:

a number-of-times calculation function of determining the cell switching number-of-times in a predetermined period of time; and a coefficient setting function of setting, on the basis of the cell switching number-of-times, a forgetting factor that is a value representing a cell switching frequency in the predetermined period of time, and the coefficient calculation function changes, in accordance with the forgetting factor, an influence degree of the first cell selection coefficient calculated last time on the first cell selection coefficient, and changes, in accordance with the forgetting factor, an influence degree of the second cell selection coefficient calculated last time on the second cell selection coefficient.

(Supplementary Note 11)

The storage medium according to any one of Supplementary Notes 8 to 10, wherein the cell selection function compares a magnitude of the first cell selection coefficient with a magnitude of a value obtained by adding a predetermined offset value to the second cell selection coefficient, and selects a cell in accordance with the comparison result.

(Supplementary Note 12)

The storage medium according to Supplementary Note 11, wherein the cell selection program further includes an offset calculation function of determining the offset value in accordance with the number of current accommodated-terminals in any one of the first cell and the second cell.

(Supplementary Note 13)

The storage medium according to Supplementary Note 12, wherein the offset calculation function divides the number of accommodated-terminals into a plurality of divisions, sets an offset adjustment value in accordance with the division, and subtracts the offset adjustment value from an initial offset value previously determined, to determine the offset value.

(Supplementary Note 14)

A cell selection method in a wireless communication terminal used in a wireless network including a first cell and a second cell each including a common portion, the method including:

a quality calculation step of determining first quality that is wireless quality of the first cell and second quality that is wireless quality of the second cell;

a resource number calculation step of determining a first resource number that is the number of usable frequency resources in the first cell and a second resource number that is the number of usable frequency resources in the second cell;

a coefficient calculation step of determining a first cell selection coefficient that is a cell selection coefficient for the first cell on the basis of a result obtained by calculating the first quality and the first resource number and determining a second cell selection coefficient that is a cell selection coefficient for the second cell on the basis of a result obtained by calculating the second quality and the second resource number; and a cell selection step of selecting any one of the first cell and the second cell on the basis of a result obtained by calculating the first cell selection coefficient and the second cell selection coefficient.

(Supplementary Note 15)

The cell selection method according to Supplementary Note 14, further including a storage step of storing the first cell selection coefficient and the second cell selection coefficient, calculated last time, wherein the coefficient calculation step determines the first cell selection coefficient on the basis of the first quality, the first resource number, and the first cell selection coefficient calculated last time, and determines the second cell selection coefficient on the basis of the second quality, the second resource number, and the second cell selection coefficient calculated last time.

(Supplementary Note 16)

The cell selection method according to Supplementary Note 15, further including:

a number-of-times calculation step of determining the cell switching number-of-times in a predetermined period of time; and a coefficient setting step of setting, on the basis of the cell switching number-of-times, a forgetting factor that is a value representing a cell switching frequency in the predetermined period of time, wherein the coefficient calculation step changes, in accordance with the forgetting factor, an influence degree of the first cell selection coefficient calculated last time on the first cell selection coefficient, and changes, in accordance with the forgetting factor, an influence degree of the second cell selection coefficient calculated last time on the second cell selection coefficient.

(Supplementary Note 17)

The cell selection method according to any one of Supplementary Notes 14 to 16, wherein the cell selection step compares a magnitude of the first cell selection coefficient with a magnitude of a value obtained by adding a predetermined offset value to the second cell selection coefficient, and selects a cell in accordance with the comparison result.

(Supplementary Note 18)

The cell selection method according to Supplementary Note 17, further including an offset calculation step of determining the offset value in accordance with the number of current accommodated-terminals in any one of the first cell and the second cell.

(Supplementary Note 19)

The cell selection method according to Supplementary Note 18, wherein the offset calculation step divides the number of accommodated-terminals into a plurality of divisions, sets an offset adjustment value in accordance with the division, and subtracts the offset adjustment value from an initial offset value previously determined, to determine the offset value.

While the present invention has been described with reference to exemplary embodiments thereof, the present invention is not limited to the exemplary embodiments described above. The constitution and details of the present invention can be subjected to various modifications which can be understood by those skilled in the art, without departing from the scope of the present invention.

This application is based upon and claims the benefit of priority from Japanese patent application No. 2013-246289, filed on Nov. 28, 2013, the disclosure of which is incorporated herein in its entirety.

REFERENCE SIGNS LIST 1, 100, 200 Wireless communication system
2 Macro cell base station
3 Pico cell base station
4, 4a, 4b, 30, 30a, 30b, 40, 40a, 40b UE
5 S1 interface
6 MME/SAE-GW
7 X1 interface
8 Macro cell
9 Pico cell
21, 31 Wireless quality calculation unit
22, 32 Usable frequency resource number calculation unit 23, 36 Cell selection coefficient calculation unit
24, 37 Cell selection processing unit
33 Previous cell selection coefficient storage unit
34 Cell selection switching number-of-times counting unit
35 Forgetting factor determination unit
41 Pico cell accommodation state determination unit
42 Offset value adjustment unit
43 Offset value generation unit
300 Wireless communication terminal
302 Quality calculation means
304 Resource number calculation means
306 Coefficient calculation means
308 Cell selection means

The invention claimed is:

1. A wireless communication terminal for use in a wireless network including a first cell and a second cell that include a common portion, the wireless communication terminal comprising:
an interface configured to receive a signal from a first cell base station and a signal from a second cell base station; and
a control circuit configured to:
determine first quality that is wireless quality of the first cell and second quality that is wireless quality of the second cell;
determine a first resource number that is the number of available frequency resources in the first cell and a second resource number that is the number of available frequency resources in the second cell;
determine a first cell selection coefficient that is a cell selection coefficient for the first cell based on a result obtained by calculating the first quality and the first resource number, and determine a second cell selection coefficient that is a cell selection coefficient for the second cell based on a result obtained by calculating the second quality and the second resource number;
select one of the first cell and the second cell based on a result of calculation using the first cell selection coefficient and the second cell selection coefficient;
store the first cell selection coefficient and the second cell selection coefficient, that were calculated last time;
determine the first cell selection coefficient based on the first quality, the first resource number, and the first cell selection coefficient calculated last time, and determine the second cell selection coefficient based on the second quality, the second resource number, and the second cell selection coefficient calculated last time;
determine a cell switching count in a predetermined period of time;
set, based on the cell switching count, a forgetting factor that is a value indicating a cell switching frequency in the predetermined period of time,
vary, in accordance with the forgetting factor, an influence degree of the first cell selection coefficient calculated last time on the first cell selection coefficient; and
vary, in accordance with the forgetting factor, an influence degree of the second cell selection coefficient calculated last time on the second cell selection coefficient.

2. The wireless communication terminal according to claim 1, wherein the control circuit is further configured to compare a magnitude of the first cell selection coefficient with a magnitude of a value obtained by adding a predetermined offset value to the second cell selection coefficient, and select a cell in accordance with a comparison result.

3. The wireless communication terminal according to claim 2, wherein the control circuit is further configured to determine the offset value in accordance with the number of current accommodated terminals in the first cell or the second cell.

4. The wireless communication terminal according to claim 3, wherein the control circuit is further configured to divide the number of accommodated terminals into a plurality of divisions, set an offset adjustment value in accordance with the division, and subtract the offset adjustment value from a predetermined initial offset value, to determine the offset value.

5. A wireless communication terminal for use in a wireless network including a first cell and a second cell that include a common portion, the wireless communication terminal comprising:
an interface configured to receive a signal from a first cell base station and a signal from a second cell base station; and
a control circuit configured to:
determine first quality that is wireless quality of the first cell and second quality that is wireless quality of the second cell;
determine a first resource number that is the number of available frequency resources in the first cell and a second resource number that is the number of available frequency resources in the second cell;
determine a first cell selection coefficient that is a cell selection coefficient for the first cell based on a result obtained by calculating the first quality and the first resource number, and determine a second cell selection coefficient that is a cell selection coefficient for the second cell based on a result obtained by calculating the second quality and the second resource number;
select one of the first cell and the second cell based on a result of calculation using the first cell selection coefficient and the second cell selection coefficient;
compare a magnitude of the first cell selection coefficient with a magnitude of a value obtained by adding a predetermined offset value to the second cell selection coefficient, and select a cell in accordance with a comparison result;
determine the offset value in accordance with the number of current accommodated terminals in the first cell or the second cell; and
divide the number of accommodated terminals into a plurality of divisions, set an offset adjustment value in accordance with the division, and subtract the offset adjustment value from a predetermined initial offset value, to determine the offset value.

6. A cell selection method in a wireless communication terminal for use in a wireless network including a first cell and a second cell that include a common portion, the method comprising:
determining first quality that is wireless quality of the first cell and second quality that is wireless quality of the second cell;
determining a first resource number that is the number of available frequency resources in the first cell and a second resource number that is the number of available frequency resources in the second cell;
determining a first cell selection coefficient that is a cell selection coefficient for the first cell based on a result obtained by calculating the first quality and the first resource number and determining a second cell selection coefficient that is a cell selection coefficient for the second cell based on a result obtained by calculating the second quality and the second resource number;

selecting one of the first cell and the second cell based on a result of calculation using the first cell selection coefficient and the second cell selection coefficient;

storing the first cell selection coefficient and the second cell selection coefficient, that were calculated last time;

determining the first cell selection coefficient based on the first quality, the first resource number, and the first cell selection coefficient calculated last time, and determining the second cell selection coefficient based on the second quality, the second resource number, and the second cell selection coefficient calculated last time;

determining a cell switching count in a predetermined period of time;

setting, based on the cell switching count, a forgetting factor that is a value indicating a cell switching frequency in the predetermined period of time;

varying, in accordance with the forgetting factor, an influence degree of the first cell selection coefficient calculated last time on the first cell selection coefficient; and varying, in accordance with the forgetting factor, an influence degree of the second cell selection coefficient calculated last time on the second cell selection coefficient.

7. The cell selection method of claim 6, the method further comprising:

comparing a magnitude of the first cell selection coefficient with a magnitude of a value obtained by adding a predetermined offset value to the second cell selection coefficient, and selecting a cell in accordance with a comparison result.

8. The cell selection method of 7, the method further comprising:

determining the offset value in accordance with the number of current accommodated terminals in the first cell or the second cell.

9. The cell selection method of claim 8, the method further comprising:

dividing the number of accommodated terminals into a plurality of divisions, setting an offset adjustment value in accordance with the division, and subtracting the offset adjustment value from a predetermined initial offset value, to determine the offset value.

10. A cell selection method in a wireless communication terminal for use in a wireless network including a first cell and a second cell that include a common portion, the method comprising:

determining first quality that is wireless quality of the first cell and second quality that is wireless quality of the second cell;

determining a first resource number that is the number of available frequency resources in the first cell and a second resource number that is the number of available frequency resources in the second cell;

determining a first cell selection coefficient that is a cell selection coefficient for the first cell based on a result obtained by calculating the first quality and the first resource number and determining a second cell selection coefficient that is a cell selection coefficient for the second cell based on a result obtained by calculating the second quality and the second resource number;

selecting one of the first cell and the second cell based on a result of calculation using the first cell selection coefficient and the second cell selection coefficient;

comparing a magnitude of the first cell selection coefficient with a magnitude of a value obtained by adding a predetermined offset value to the second cell selection coefficient, and selecting a cell in accordance with a comparison result;

determining the offset value in accordance with the number of current accommodated terminals in the first cell or the second cell; and dividing the number of accommodated terminals into a plurality of divisions, setting an offset adjustment value in accordance with the division, and subtracting the offset adjustment value from a predetermined initial offset value, to determine the offset value.

* * * * *